US 12,540,999 B2

United States Patent
Qian et al.

(10) Patent No.: US 12,540,999 B2
(45) Date of Patent: Feb. 3, 2026

(54) UWB BASE STATION ANOMALY DETECTION METHOD AND ELECTRONIC DEVICE

(71) Applicant: Huawei Technologies Co., Ltd., Shenzhen (CN)

(72) Inventors: Kai Qian, Shenzhen (CN); Wei Dong, Xi'an (CN); Haowei Xu, Xi'an (CN); Qingfeng Xue, Xi'an (CN); Erli Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 18/283,345

(22) PCT Filed: Mar. 18, 2022

(86) PCT No.: PCT/CN2022/081790
§ 371 (c)(1),
(2) Date: Sep. 21, 2023

(87) PCT Pub. No.: WO2022/199496
PCT Pub. Date: Sep. 29, 2022

(65) Prior Publication Data
US 2024/0103113 A1    Mar. 28, 2024

(30) Foreign Application Priority Data
Mar. 24, 2021    (CN) .......................... 202110313781.X

(51) Int. Cl.
*G01S 5/02*    (2010.01)
*H04W 64/00*    (2009.01)

(52) U.S. Cl.
CPC ............. *G01S 5/021* (2013.01); *H04W 64/00* (2013.01)

(58) Field of Classification Search
CPC ..... H04W 64/00; H04W 4/023; H04W 4/029; H04W 4/02; H04W 4/025; H04W 64/003;
(Continued)

(56) References Cited

U.S. PATENT DOCUMENTS

2019/0274008 A1* 9/2019 Grabbe ................ H04W 4/025

FOREIGN PATENT DOCUMENTS

CN    106211080 A    12/2016
JP    5025675 B2 *    9/2012

* cited by examiner

*Primary Examiner* — Diane D Mizrahi
*Assistant Examiner* — Jing Gao
(74) *Attorney, Agent, or Firm* — Slater Matsil, LLP

(57) ABSTRACT

This application relates to a UWB base station anomaly detection method. The method includes: obtaining a first distance that is between each of the N UWB base stations and the UWB tag and that is obtained through measurement; obtaining an estimated value of spatial coordinates of the UWB tag in the first coordinate system based on the first distance and spatial coordinates of each UWB base station in the first coordinate system; obtaining a second distance between each UWB base station and the UWB tag based on the estimated value and the spatial coordinates of each UWB base station in the first coordinate system; and determining, based on the first distance and the second distance that correspond to each UWB base station, whether a UWB base station in the N UWB base stations is abnormal.

20 Claims, 20 Drawing Sheets

(58) Field of Classification Search
CPC ......... H04W 4/33; H04W 4/021; H04W 4/80;
H04W 56/0065; H04W 56/0015; H04W
12/122; H04W 16/18; H04W 16/20;
H04W 36/322; H04W 4/38; H04W 36/32;
G01S 5/14; G01S 5/021; G01S 5/06;
G01S 5/011; G01S 5/10; G01S 13/767;
G01S 5/0221; G01S 5/02213; G01S
5/0284; G01S 5/0257; G01S 5/0236;
G01S 5/0268; G01S 5/0242; G01S
5/02524; G01S 5/0249; G01S 13/46;
G01S 5/0252; G01S 13/08; G01S 5/0054;
G01S 19/42; G01S 19/07
See application file for complete search history.

UWB BASE STATION ANOMALY DETECTION METHOD AND ELECTRONIC DEVICE

CROSS REFERENCE TO RELATED APPLICATIONS

This application is a national stage of International Application No. PCT/CN2022/081790, filed on Mar. 18, 2022, which claims priority to Chinese Patent Application No. 202110313781.X, filed on Mar. 24, 2021. Both of the aforementioned applications are hereby incorporated by reference in their entireties.

TECHNICAL FIELD

This application relates to the wireless positioning field, and in particular, to a UWB base station anomaly detection method and electronic device.

BACKGROUND

An ultra-wideband (ultra-wideband, UWB) positioning technology can provide accurate positioning in a wireless manner, and is widely used in various indoor positioning scenarios. In the indoor positioning scenario, a UWB positioning system including a UWB tag and a UWB base station is generally used for implementation. To ensure that the UWB positioning system continuously provides an accurate positioning result, the UWB positioning system needs to be monitored, so that an anomaly can be learned in time when occurring on the UWB positioning system. Generally, the UWB base station is more important. If the anomaly occurs on the UWB base station, the UWB positioning result is abnormal. A hardware circuit like a watchdog circuit is disposed inside the UWB base station for real-time monitoring, so that an internal circuit anomaly of the UWB base station can be detected in time. However, in some scenarios, for example, a scenario in which an internal circuit of the UWB base station is normal, but the UWB base station is displaced, for example, the UWB base station falls off, or a scenario in which an internal circuit of the UWB base station is normal but the UWB base station is blocked, the UWB positioning result is also affected, and an anomaly of the UWB positioning result is caused. This type of UWB base station anomaly cannot be detected by using the foregoing hardware circuit. Therefore, how to timely learn of the anomaly of the UWB base station caused by displacement or blocking of the UWB base station becomes a requirement.

SUMMARY

To resolve the foregoing technical problem, this application provides a UWB base station anomaly detection method and an electronic device. According to the technical solution provided in this application, an anomaly caused by displacement or blocking of a UWB base station can be detected in time.

According to a first aspect, an embodiment of this application provides a UWB base station anomaly detection method. The method may be applied to a UWB tag or a UWB base station, and the UWB tag or the UWB base station is located in a UWB positioning system. The UWB positioning system includes one UWB tag and N UWB base stations, where N is a positive integer greater than or equal to 3. A first coordinate system is established based on the UWB positioning system. The method includes: obtaining a first distance that is between each of the N UWB base stations and the UWB tag and that is obtained through measurement; obtaining an estimated value of spatial coordinates of the UWB tag in the first coordinate system based on the first distance between each UWB base station and the UWB tag and spatial coordinates of each UWB base station in the first coordinate system; obtaining a second distance between each UWB base station and the UWB tag based on the estimated value of the spatial coordinates of the UWB tag in the first coordinate system and the spatial coordinates of each UWB base station in the first coordinate system; and determining, based on the first distance and the second distance that correspond to each UWB base station, whether a UWB base station in the N UWB base stations is abnormal.

Generally, after a UWB base station is abnormally displaced or is blocked by an obstruction, the UWB base station cannot recover in short time, and a difference between a first distance and a second distance corresponding to the abnormal UWB base station increases significantly. Therefore, when a UWB base station is abnormally displaced or is blocked by an obstruction, by using the UWB base station anomaly detection method, it can be detected in time, based on the first distance and the second distance that correspond to each UWB base station, that the UWB base station in the UWB positioning system is abnormal. In other words, an anomaly caused by displacement or blocking of the UWB base station can be detected in time by using this method. In addition, when hardware of a UWB base station is faulty, a difference between a first distance and a second distance corresponding to the UWB base station may also be abnormal. Therefore, when hardware of a UWB base station is faulty, by using the UWB base station anomaly detection method, it can also be detected that a UWB base station in the UWB positioning system is abnormal.

According to the first aspect, the determining, based on the first distance and the second distance that correspond to each UWB base station, whether a UWB base station in the N UWB base stations is abnormal includes: obtaining, based on the first distance and the second distance that correspond to each UWB base station, an absolute value of a difference between the first distance and the second distance that correspond to each UWB base station, and summing absolute values of differences corresponding to all UWB base stations, to obtain a first value; updating an anomaly detection times variable based on the first value and a product value of a preset threshold coefficient and a sliding threshold; and when an updated anomaly detection times variable is greater than a preset anomaly detection times threshold, determining that a UWB base station in the UWB positioning system is abnormal. The sliding threshold and the anomaly detection times variable each are preset with an initial value during initialization.

Specifically, the threshold coefficient is a coefficient of the sliding threshold. The threshold coefficient is a preset fixed value, and may be manually configured. For example, the threshold coefficient may be a value greater than 1 and less than 5, for example, may be 1.8. A larger threshold coefficient indicates a lower false alarm rate when the UWB base station anomaly detection method is used for detection. The false alarm rate indicates a probability that a UWB base station is not faulty but is detected as faulty in the UWB base station anomaly detection method.

The sliding threshold is a variable that reflects a current positioning error. When the positioning error gradually increases, the sliding threshold also gradually increases. When the positioning error suddenly increases, it may be considered that a UWB base station is abnormal. An initial value of the sliding threshold may be a value in a range from 0.5 to 1, for example, may be 0.5. The initial value of the sliding threshold is set to a value greater than 0. This can avoid false detection. In a plurality of detections, a value of the sliding threshold is gradually updated to a proper range.

An initial value of the anomaly detection times variable may be 0. This is not limited.

According to the first aspect or any implementation of the first aspect, the updating an anomaly detection times variable based on the first value and a product value of a preset threshold coefficient and a sliding threshold includes: when the first value is greater than the product value of the threshold coefficient and the sliding threshold, increasing the anomaly detection times variable by an amplitude of a first preset interval; or when the first value is less than the product value of the threshold coefficient and the sliding threshold, reducing the anomaly detection times variable by an amplitude of a second preset interval.

The first preset interval and the second preset interval may be the same or may be different. Values of the first preset interval and the second preset interval are not limited herein. For example, when the first value is greater than the product value of the threshold coefficient and the sliding threshold, the anomaly detection times variable may be increased by one; or when the first value is less than the product value of the threshold coefficient and the sliding threshold, the anomaly detection times variable may be decreased by one.

In this implementation, when the first value is greater than the product value of the threshold coefficient and the sliding threshold, the anomaly detection times variable is increased by the amplitude of the first preset interval. This can intuitively indicate whether a data amount exceeds the product of the sliding threshold and the threshold coefficient for a plurality of consecutive times in short time in the UWB base station anomaly detection process. If yes, it may be considered that a UWB base station is abnormal. When the first value is less than the product value of the threshold coefficient and the sliding threshold, the anomaly detection times variable is reduced by the amplitude of the second preset interval. In this way, a case in which a sum of absolute values of differences corresponding to all UWB base stations is greater than the product of the threshold coefficient and the sliding threshold in only one or two detection processes is filtered out, and it is considered that there is no abnormal UWB base station, so that occurrence of false detection is reduced.

Optionally, in the UWB base station anomaly detection method, when the first value is equal to the product value of the threshold coefficient and the sliding threshold, the anomaly detection times variable may be increased by the amplitude of the first preset interval, or the anomaly detection times variable may be reduced by the amplitude of the second preset interval. This is not limited.

According to the first aspect or any implementation of the first aspect, after the reducing the anomaly detection times variable by an amplitude of a second preset interval, the method further includes: updating the sliding threshold based on the first value.

According to the first aspect or any implementation of the first aspect, the updating the sliding threshold based on the first value includes: updating the sliding threshold according to the following formula:

$$T_w = a \cdot T_{w-1} + (1-a) \cdot S$$

$T_{w-1}$ represents the sliding threshold; $T_w$ represents an updated sliding threshold; S represents the first value; and a represents a filtering coefficient.

In the UWB base station anomaly detection method, an update mechanism of the abnormality detection times variable and the sliding threshold and a rule for determining a UWB base station anomaly with reference to the abnormality detection times variable and the sliding threshold can reduce influence of some outliers in the absolute values of the differences between first distances and second distances corresponding to all UWB base stations on a result of the UWB base station anomaly detection, and improve detection accuracy.

According to the first aspect or any implementation of the first aspect, after the increasing the anomaly detection times variable by an amplitude of a first preset interval, or after the updating the sliding threshold, the method further includes: when the updated anomaly detection times variable is less than 0, setting the anomaly detection times variable to 0.

Specifically, setting the anomaly detection times variable to 0 when the updated anomaly detection times variable is less than 0 can make the anomaly detection times variable fall in a meaningful value range in each UWB base station anomaly detection process, thereby improving detection accuracy.

According to the first aspect or any implementation of the first aspect, after the determining that a UWB base station in the N UWB base stations is abnormal, the method further includes: determining a first target UWB base station, wherein the first target UWB base station is any one of the N UWB base stations; obtaining third distances that are between the first target UWB base station and other N−1 UWB base stations and that are obtained by the first target UWB base station through a plurality of times of measurement; obtaining distance errors between the first target UWB base station and the other N−1 UWB base stations in each measurement based on the third distances and spatial coordinates of the first target UWB base station and the other N−1 UWB base stations in the first coordinate system; and when a quantity of times that a distance error between at least one of the other N−1 UWB base stations and the first target UWB base station exceeds a preset error threshold in the plurality of times of measurement is greater than a preset quantity of times, determining that the at least one UWB base station is abnormal.

According to the first aspect or any implementation of the first aspect, when a quantity of times that a distance error between each of the other N−1 UWB base stations and the first target UWB base station exceeds the error threshold in the plurality of times of measurement is greater than a preset quantity of times, a fourth distance that is between any two UWB base stations (for example, a third target UWB base station and a fourth target UWB base station) in the other N−1 UWB base stations and that is obtained by performing a plurality of times of measurement is obtained. A distance error between the two UWB base stations in each measurement based on the fourth distance and spatial coordinates of the two UWB base stations in the first coordinate system is obtained. When a quantity of times that a distance error between two UWB base station exceeds a preset error threshold in the plurality of times of measurement is greater than a preset quantity of times, it is determined that the other N−1 UWB base stations are all abnormal. When a quantity of times that a distance error between two UWB base station exceeds a preset error threshold in the plurality of times of measurement is less than a preset quantity of times, it is determined that the first target UWB base station is abnormal.

Both the preset quantity of times and the error threshold may be manually configured values. For example, the error threshold may be 0.1 m, 0.2 m, or the like; and the preset quantity of times may be 6, 7, or the like.

In other words, in the UWB base station anomaly detection method, after it is determined that a UWB base station in the N UWB base stations is abnormal, which UWB base station is abnormal or which UWB base stations are abnormal may be further determined by mutual measurement of distances between the UWB base stations.

Optionally, in this embodiment of this application, the UWB tag may be integrated into an electronic device. After it is determined which UWB base station is abnormal or which UWB base stations are abnormal, the electronic device may inform, through voice output and/or visual output, of which UWB base station is abnormal or which UWB base stations are abnormal.

Optionally, the abnormal UWB base station may raise an alarm through voice output (for example, a horn) and/or visual output (for example, flashing alarm lights and the like, or displaying a notification message or the like on a mobile device) by using a device (for example, an associated mobile device) integrated to the UWB base station or associated with the UWB base station, or may raise an alarm in another manner. This is not limited in this application.

According to the first aspect or any implementation of the first aspect, the obtaining an estimated value of spatial coordinates of the UWB tag in the first coordinate system based on the first distance between each UWB base station and the UWB tag and spatial coordinates of each UWB base station in the first coordinate system include: obtaining a first equation set including N equations based on the first distance between each UWB base station and the UWB tag and the spatial coordinates of each UWB base station in the first coordinate system; and solving the first equation set in a first calculation manner, to obtain the estimated value of the spatial coordinates of the UWB tag in the first coordinate system.

According to the first aspect or any implementation of the first aspect, the solving the first equation set in a first calculation manner, to obtain the estimated value of the spatial coordinates of the UWB tag in the first coordinate system includes: calculating the first equation set in a Newton's method; when each Newton iteration is performed, solving a linear matrix equation in a Newton iteration cycle in a least square method; and when the Newton iteration converges, outputting a calculation result of the first equation set, where the calculation result is the estimated value of the spatial coordinates of the UWB tag in the first coordinate system.

For example, it is assumed that the N UWB base stations included in the UWB positioning system are successively the first UWB base station to the $N^{th}$ UWB base station; spatial coordinates of the first UWB base station in the first coordinate system are $(x^{(1)}, y^{(1)}, z^{(1)})$, and a first distance between the first UWB base station and the UWB tag is $\rho^{(1)}$; spatial coordinates of the second UWB base station in the first coordinate system are $(x^{(2)}, y^{(2)}, z^{(2)})$ and a first distance between the second UWB base station and the UWB tag is $\rho^{(2)}$; and by analogy, spatial coordinates of the $N^{th}$ UWB base station in the first coordinate system are $(x^{(n)}, y^{(n)}, z^{(n)})$, and a first distance between the $N^{th}$ UWB base station and the UWB tag is $\rho^{(n)}$.

In this case, a first equation set established based on first distances between all UWB base stations from the first UWB base station to the $N^{th}$ UWB base station and the UWB tag and spatial coordinates of all UWB base stations in the first coordinate system may be an equation set (1), and the first equation set is a nonlinear equation set. The first equation set includes N nonlinear equations that are in a one-to-one correspondence with the first UWB base station to the $N^{th}$ UWB base station.

$$\sqrt{(x^{(1)}-x)^2+(y^{(1)}-y)^2+(z^{(1)}-z)^2}=\rho^{(1)}$$

$$\sqrt{(x^{(2)}-x)^2+(y^{(2)}-y)^2+(z^{(2)}-z)^2}=\rho^{(2)}$$

$$\sqrt{(x^{(n)}-x)^2+(y^{(n)}-y)^2+(z^{(n)}-z)^2}=\rho^{(n)}$$

(x, y, z) is an unknown parameter, and represents the spatial coordinates of the UWB tag in the first coordinate system.

Solving the equation set (1) in the first calculation manner includes: calculating the equation set (1) in the Newton's method; when each Newton iteration is performed, solving a linear matrix equation in a Newton iteration cycle in the least square method; and when the Newton iteration converges, outputting a calculation result (x, y, z) of the equation set (1). (x, y, z) is an estimated value of the spatial coordinates of the UWB tag in the first coordinate system.

It should be noted that spatial coordinates of the UWB base stations, the UWB tag, and the like in the first coordinate system are spatial coordinates of central locations of the UWB base stations, the UWB tag, and the like in the first coordinate system.

According to a second aspect, an embodiment of this application provides an electronic device. The electronic device may be configured to implement the UWB base station anomaly detection method in the first aspect. The electronic device may be a UWB tag, a UWB base station, a server, a computer, or the like. A function of the electronic device may be implemented by hardware, or may be implemented by hardware executing corresponding software. The hardware or the software includes one or more modules or units, for example, a transceiver unit and a processing unit, corresponding to the foregoing functions.

The transceiver unit may be configured to send and receive information or data, or configured to communicate with another device. The processing unit may be configured to process data. The transceiver unit and the processing unit may cooperate to implement the UWB base station anomaly detection method in the first aspect.

According to a third aspect, an embodiment of this application provides a UWB tag or a UWB base station. The UWB tag or the UWB base station includes a processor, a memory, and a computer program, where the computer program is stored in the memory. When the computer program is executed by the processor, the UWB tag or the UWB base station is enabled to perform the UWB base station anomaly detection method in the first aspect or any implementation of the first aspect.

According to a fourth aspect, an embodiment of this application further provides a server or a computer. The server or the computer may be used as a positioning engine of a UWB positioning system. The server or the computer includes a processor, a memory, and a computer program, where the computer program is stored in the memory. When the computer program is executed by the processor, the server or the computer is enabled to perform the UWB base station anomaly detection method in the first aspect or any implementation of the first aspect.

According to a fifth aspect, an embodiment of this application provides a computer-readable storage medium, where the computer-readable storage medium includes a computer program. When the computer program runs on a UWB tag or a UWB base station, the UWB tag or the UWB base station is enabled to perform the UWB base station anomaly detection method in the first aspect or any implementation of the first aspect.

According to a sixth aspect, an embodiment of this application provides a computer program product, including computer-readable code. When the computer-readable code is run in a UWB tag or a UWB base station, the UWB tag or the UWB base station is enabled to implement the UWB base station anomaly detection method in the first aspect or any implementation of the first aspect.

For technical effects corresponding to the second aspect and any implementation of the second aspect, the third aspect and any implementation of the third aspect, the fourth aspect and any implementation of the fourth aspect, the fifth aspect and any implementation of the fifth aspect, and the sixth aspect and any implementation of the sixth aspect, refer to the technical effect corresponding to the first aspect or any implementation of the first aspect. Details are not described herein again.

BRIEF DESCRIPTION OF THE DRAWINGS

FIG. 7A-1 and FIG. 7A-2 are a schematic flowchart of a UWB base station anomaly detection method according to an embodiment of this application;

DETAILED DESCRIPTION OF ILLUSTRATIVE EMBODIMENTS

Figure 1:
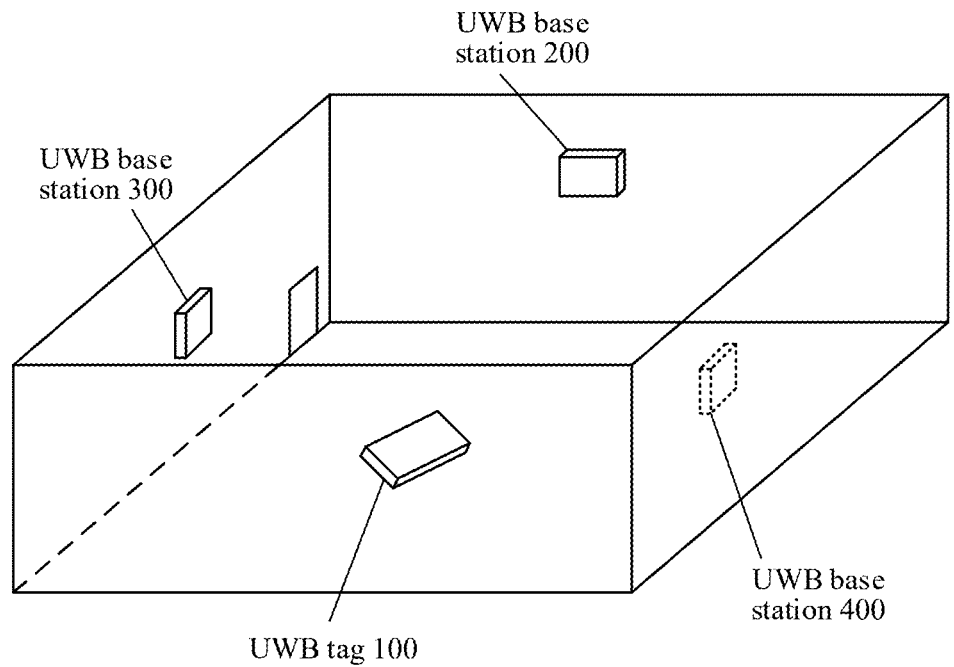
FIG. 1 is a schematic composition diagram of a UWB positioning system according to an embodiment of this application.

Terms used in the following embodiments are merely intended to describe specific embodiments, but are not intended to limit this application. Singular expressions "one", "a", "the", "foregoing", "this", and "the one" used in this specification and the appended claims of this application are also intended to include expressions such as "one or more", unless otherwise specified in the context clearly. It should be further understood that in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" usually indicates an "or" relationship between the associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner. The term "connection" includes a direct connection and an indirect connection, unless otherwise indicated.

In the following, the terms "first" and "second" are only used for description, and cannot be understood as indicating or implying relative importance or implicitly indicating a quantity of indicated technical features. Therefore, a feature limited by "first" or "second" may explicitly or implicitly include one or more features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the term "example", "for example", or the like is intended to present a relative concept in a specific manner.

An ultra-wideband (ultra-wideband, UWB) positioning technology is a wireless positioning technology based on ultra-wideband communication, and is widely used in various indoor positioning scenarios. In the indoor positioning scenario, a UWB positioning system including a UWB tag and a UWB base station is generally used for implementation.

For example, FIG. 1 is a schematic composition diagram of a UWB positioning system according to an embodiment of this application. As shown in FIG. 1, the UWB positioning system includes at least a UWB tag 100, a UWB base station 200, a UWB base station 300, and a UWB base station 400. The UWB tag 100, the UWB base station 200, the UWB base station 300, and the UWB base station 400 are located in a same room. It should be noted that although FIG. 1 shows an example in which a quantity of UWB base stations is 3, the quantity of UWB base stations may also be another positive integer greater than 3. The UWB base station 200, the UWB base station 300, and the UWB base station 400 are deployed at different locations (for example, on the walls) in the same room. The UWB tag 100 may be deployed on an electronic device that needs to be positioned. For example, the UWB tag 100 may alternatively be a UWB chip integrated inside the electronic device. Alternatively, the UWB tag 100 may be an independent electronic device. This is not limited herein.

To ensure that the UWB positioning system continuously provides an accurate positioning result, the UWB positioning system needs to be monitored, so that an anomaly can be learned in time when occurring on the UWB positioning system. Generally, the UWB base station is more important. If the anomaly occurs on the UWB base station, the UWB positioning result is abnormal. A hardware circuit like a watchdog circuit is disposed inside the UWB base station for real-time monitoring, so that an internal circuit anomaly of the UWB base station can be detected in time. However, in some cases, the UWB base station anomaly cannot be detected by using the foregoing internal hardware circuit.

Figure 2:
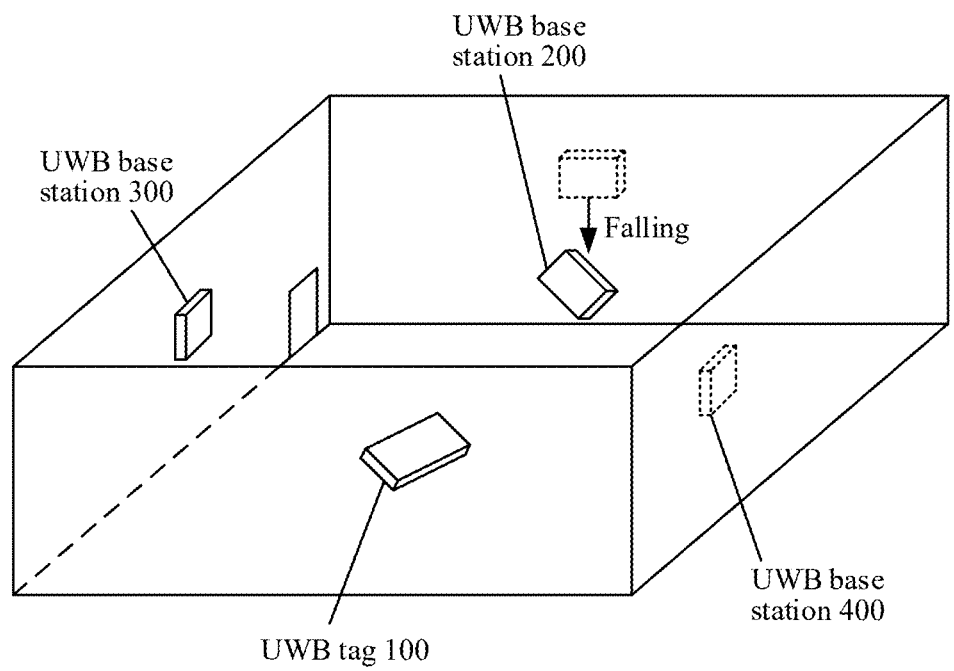
FIG. 2 is a schematic diagram of a displacement of a UWB base station in the UWB positioning system shown in FIG. 1.

For example, FIG. 2 is a schematic diagram of a displacement of a UWB base station in the UWB positioning system shown in FIG. 1. As shown in FIG. 2, when the UWB base station 200 falls from the original position shown in FIG. 1, the UWB base station 200 is displaced. In this case, a spatial location of the UWB base station 200 in the UWB positioning system changes, causing an inaccurate positioning result of the UWB tag 100.

Figure 3:
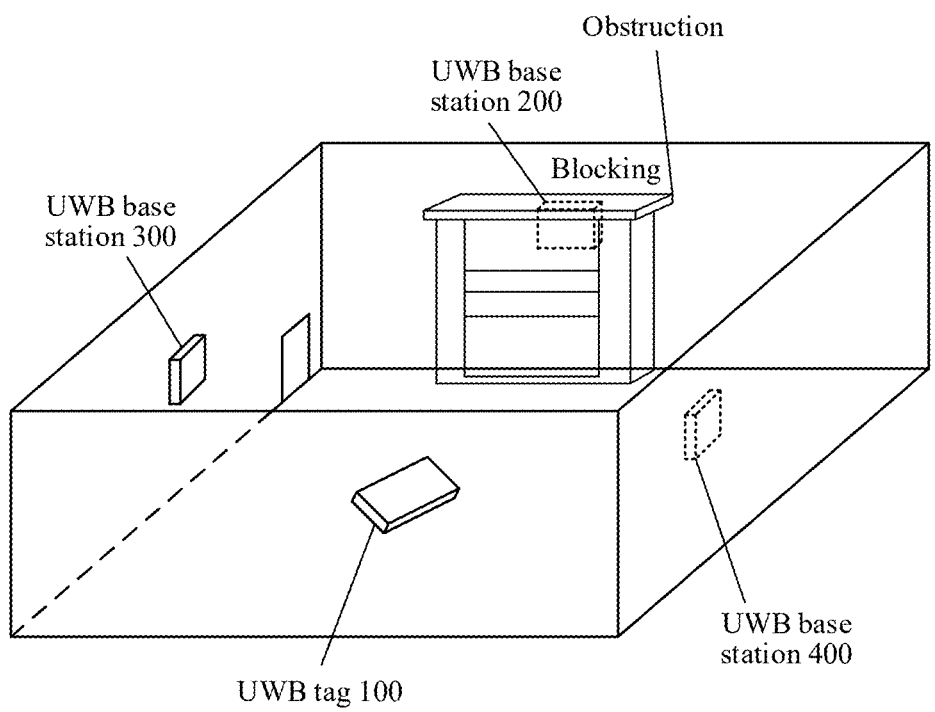
FIG. 3 is a schematic diagram of blocking of a UWB base station in the UWB positioning system shown in FIG. 1.

For example, FIG. 3 is a schematic diagram of blocking of a UWB base station in the UWB positioning system shown in FIG. 1. As shown in FIG. 3, when the UWB base station 200 is blocked, a signal received by the UWB base station 200 may become weaker. In addition, signals that are transmitted by the UWB base station 200 and that are received by the UWB tag 100, the UWB base station 300, and the UWB base station 400 may also become weaker. In this case, when the UWB base station 200 measures a distance or a relative orientation between the UWB base station 200 and the UWB tag 100, an error may also occur in an obtained measurement result, which further causes an inaccurate positioning result of the UWB tag 100.

It should be noted that, FIG. 2 and FIG. 3 only use the UWB base station 200 as an example for description, and a same case may occur on the UWB base station 300 or the UWB base station 400 as the UWB base station 200, which further causes an inaccurate positioning result of the UWB tag 100. In addition, the UWB positioning system may further include another UWB tag. For ease of description, a case in which there is one UWB tag 100 and three UWB base stations, and the UWB base station 200 in the three UWB base stations is displaced or blocked is used as an example for description herein.

In the foregoing scenario, although the internal circuit of the UWB base station is normal, the UWB base station is displaced or blocked. Consequently, the UWB positioning result is abnormal. In addition, this type of UWB base station anomaly cannot be detected by the foregoing internal hardware circuit of the UWB base station. Therefore, how to timely learn of the anomaly of the UWB base station caused by cases including but not limited to displacement and blocking of the UWB base station becomes a requirement.

To resolve the foregoing technical problem, this application provides a UWB base station anomaly detection method and an electronic device. According to the technical solution provided in this application, an anomaly caused by displacement or blocking of a UWB base station can be detected in time, and further, a UWB base station anomaly caused by a hardware circuit fault or the like of the UWB base station can be detected in time.

Figure 4:
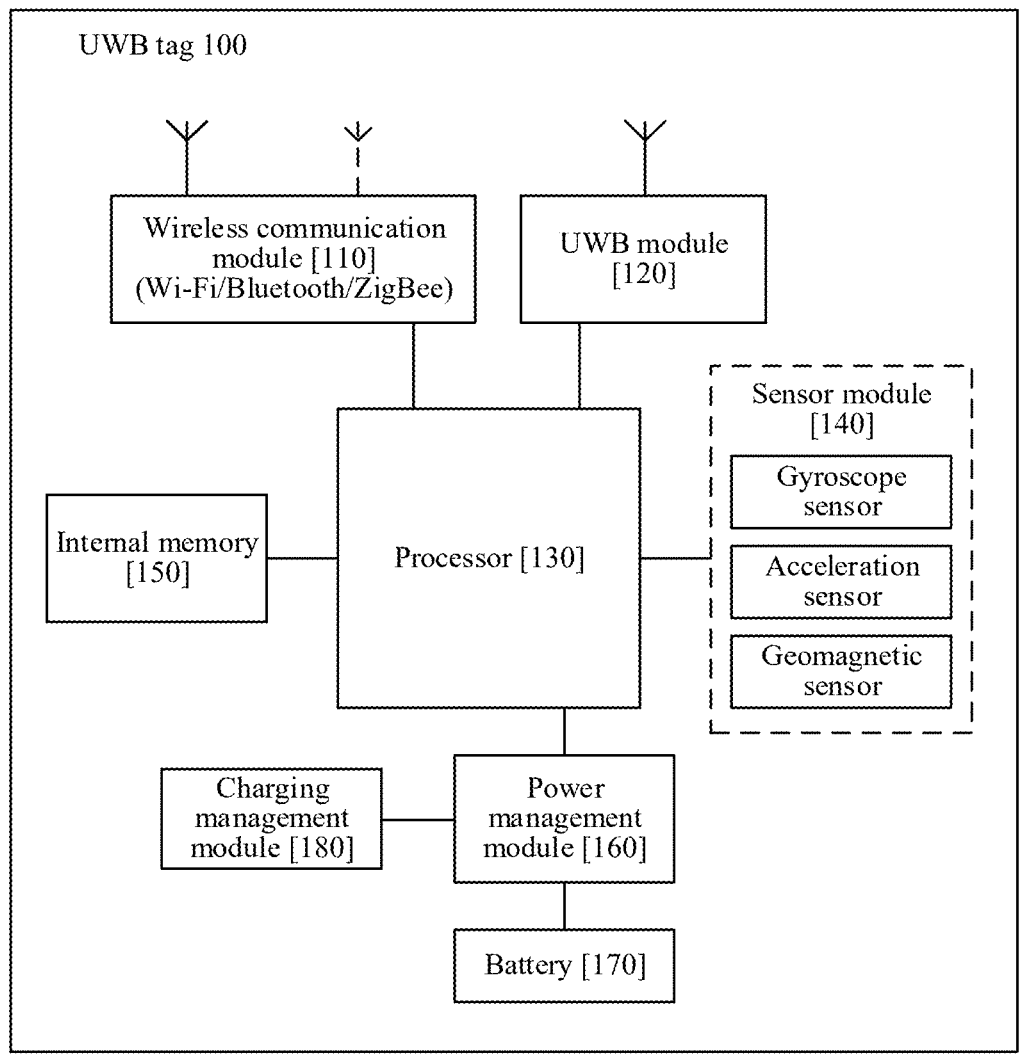
FIG. 4 is a schematic diagram of a structure of a UWB tag in a UWB positioning system according to an embodiment of this application.

For example, FIG. 4 is a schematic diagram of a structure of a UWB tag according to an embodiment of this application. As shown in FIG. 4, the UWB tag 100 may include a wireless communication module no, a UWB module 120, a processor 130, a sensor module 140, an internal memory 150, a charging management module 180, and a power management module 160.

The wireless communication module no may provide a solution that is applied to the UWB tag 100 and that includes a wireless communication manner like a wireless local area network (wireless local area network, WLAN) (for example, a wireless fidelity (wireless fidelity, Wi-Fi) network), Bluetooth (bluetooth, BT), and a ZigBee network. The wireless communication module no may be one or more components integrating at least one communication processing module.

The UWB module 120 may provide solutions such as UWB communication and ranging (for example, measuring a distance between the UWB tag and the UWB base station) applied to the UWB tag 100. For example, the UWB module 120 on the UWB tag wo needs to integrate only one UWB antenna.

The processor 130 may include one or more processing units. The processor 130 is generally configured to process communication or ranging information (where for example, in this embodiment of this application, the ranging information may include a distance between each of the first UWB base station to the $N^{th}$ UWB base station and the UWB tag 100 obtained through measurement) output by the UWB module 120. For example, the processor 130 may be configured to calculate a positioning result of the UWB tag ma. The positioning result is spatial coordinates of the UWB tag 100 in a first coordinate system. The first coordinate system is a navigation coordinate system of the UWB positioning system (where for details, refer to the subsequent embodiment).

The sensor module 140 may include a gyroscope sensor, an acceleration sensor, a magnetic sensor, and the like. In this embodiment of this application, the sensor module 140 may further output information about an azimuth, a pitch angle, and a roll angle of the UWB tag ma. When the UWB tag 100 may further be positioned in the UWB positioning system with reference to the azimuth, the pitch angle, and the roll angle of the UWB tag wo, so that a position of the UWB tag 100 is more accurate.

The internal memory 150 may be configured to store one or more computer programs. The one or more computer programs include instructions. The processor 130 may run the foregoing instructions stored in the internal memory, so that the UWB tag performs the UWB base station anomaly detection method provided in this embodiment of this application, processing of various applications and data, and the like. The internal memory 150 may include a code storage area and a data storage area.

The power management module 160 is configured to connect a battery 170, the processor 130, and the charging management module 180. The power management module 160 receives input of the battery 170 and/or the charging management module 180, and supplies power to the processor 130, the internal memory 150, the wireless communication module no, and the like.

The charging management module 180 is configured to: receive charging input from a charger, and charge the battery 170. The charger may be a wireless charger or a wired charger.

It may be understood that the components shown in FIG. 4 do not constitute a specific limitation on the structure of the UWB tag. In some other embodiments of this application, the UWB tag 100 may include more or fewer components than those shown in FIG. 4, or combine some components, or split some components, or have different component arrangements. The components shown in FIG. 4 may be implemented by using hardware, software, or a combination of software and hardware.

Optionally, in this embodiment of this application, the UWB tag may be an independent electronic device (for example, a locator), or may be a UWB positioning module (for example, a UWB chip) deployed on an electronic device (for example, a first electronic device). The electronic device includes but is not limited to a tablet computer, a desktop computer, a portable electronic device (like a laptop computer, Laptop), a smart television (like a smart screen), a vehicle-mounted computer, a smart speaker, an augmented reality (augmented reality, AR) device, a virtual reality (virtual reality, VR) device, and another smart device. An example embodiment of the electronic device includes but is not limited to a portable or non-portable electronic device on which iOS®, Android®, Harmony®, Windows®, Linux, or another operating system is installed. The portable electronic device includes but is not limited to a smartphone, a smart headset, a tablet computer, a wearable electronic device (like a smartwatch, a smart band, a smart ring, and smart glasses) with a wireless communication function, and the like. A specific product form of the UWB tag is not limited in embodiments of this application.

Figure 5:
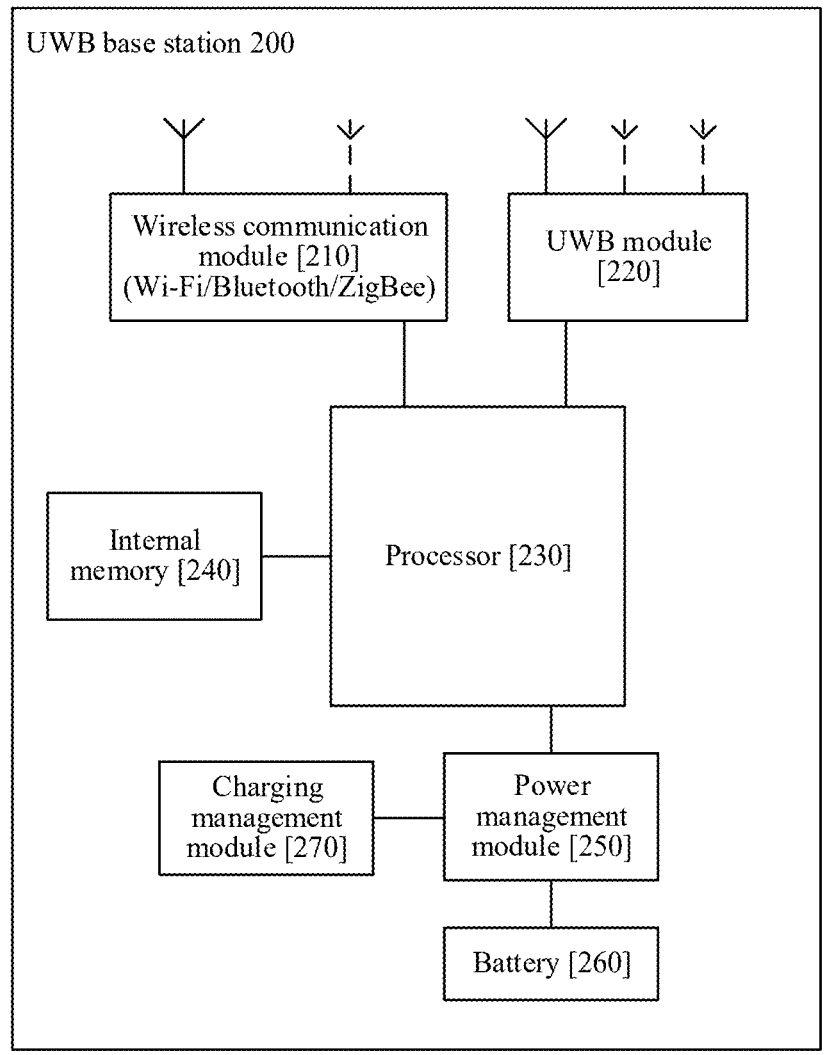
FIG. 5 is a schematic diagram of a structure of a UWB base station in a UWB positioning system according to an embodiment of this application.

For example, FIG. 5 is a schematic diagram of a structure of a UWB base station according to an embodiment of this application. The following uses the UWB base station 200 as an example. As shown in FIG. 5, the UWB base station 200 may include a wireless communication module 210, a UWB module 220, a processor 230, an internal memory 240, a power management module 250, a battery 260, and a charging management module 270.

The wireless communication module 210 may provide a solution that is applied to the UWB base station 200 and that includes a wireless communication manner like a wireless local area network (wireless local area network, WLAN) (for example, a wireless fidelity (wireless fidelity, Wi-Fi) network), Bluetooth (bluetooth, BT), and a ZigBee network. The wireless communication module 210 may be one or more components integrating at least one communication processing module.

The UWB module 220 may provide solutions such as UWB communication and ranging (for example, calculating a distance between the UWB tag and the UWB base station and a distance between different UWB base stations) applied to the UWB base station 200. The UWB module 220 on the UWB base station 200 may carry one UWB antenna, or may carry three or more UWB antennas. This is not limited in this application.

The processor 230 may include one or more processing units. The processor 230 may be configured to process data in the UWB base station 200. The internal memory 240 may be configured to store one or more computer programs, and the one or more computer programs include instructions. In some embodiments, the processor 230 may also run the instructions stored in the internal memory 240, so that the UWB base station 200 performs the steps of the UWB base station anomaly detection method provided in this embodiment of this application. The internal memory 240 may include a code storage area and a data storage area.

The power management module 250 is configured to connect the battery 260, the processor 230, and the charging management module 270. The power management module 250 receives input of the battery 260 and/or the charging management module 270, and supplies power to the processor 230, the internal memory 240, the wireless communication module 210, and the like.

The charging management module 270 is configured to: receive charging input from a charger, and charge the battery 260. The charger may be a wireless charger or a wired charger.

Similar to the UWB tag, in this embodiment of this application, the UWB base station 200 may exist independently as an electronic device, or may be integrated into another electronic device (for example, a third electronic device). This is not limited in this application. For a specific device form of the third electronic device, refer to the device form of the first electronic device. This is not limited in this application either.

It may be understood that the structure shown in FIG. 5 does not constitute a specific limitation on the UWB base station. In some other embodiments of this application, the UWB base station 200 may alternatively include more or fewer components than those shown in the figure, or combine some components, or split some components, or have different component arrangements. The components shown in the figure may be implemented by using hardware, software, or a combination of software and hardware.

For example, in some implementations, the UWB base station anomaly detection method provided in this embodiment of this application may be performed by the UWB tag. An implementation process of the UWB base station anomaly detection method may include the following four parts.

Part 1: The UWB tag obtains a distance that is between each UWB base station in the UWB system and the UWB tag and that is obtained through measurement.

Part 2: The UWB tag obtains, through calculation, a location of the UWB tag in the UWB positioning system based on a location of each UWB base station in the UWB positioning system and the distance that is between each UWB base station and the UWB tag and that is obtained through measurement in Part 1.

Part 3: The UWB tag re-calculates the distance between each UWB base station in the UWB system and the UWB tag based on the location of each UWB base station in the UWB positioning system and the location that is of the UWB tag in the UWB positioning system and that is obtained through calculation in Part 2.

Part 4: The UWB tag determines, based on the distance that is between each UWB base station and the UWB tag and that is obtained through measurement in Part 1 and the distance that is between each UWB base station and the UWB tag and that is obtained through re-calculation in Part 3, whether a UWB base station in the UWB positioning system is abnormal.

For example, for the UWB positioning system shown in FIG. 1: In Part 1, the UWB tag 100 may obtain distances that are between the UWB tag 100 and the UWB base station 200, the UWB base station 300, and the UWB base station 400 and that are obtained through measurement. In Part 2, the UWB tag 100 may calculate the location of the UWB tag 100 in the UWB positioning system based on locations of the UWB base station 200, the UWB base station 300, and the UWB base station 400 in the UWB positioning system, and the distances that are between the UWB tag 100 and the UWB base station 200, the UWB base station 300, and the UWB base station 400 and that are obtained through measurement in Part 1. In Part 3, the UWB tag 100 may re-calculate the distances that are between the UWB tag 100 and the UWB base station 200, the UWB base station 300, and the UWB base station 400 based on the locations of the UWB base station 200, the UWB base station 300, and the UWB base station 400 in the UWB positioning system, and the location that is of the UWB tag 100 in the UWB positioning system and that is obtained through calculation in Part 2. In Part 4, the UWB tag 100 may determine, based on the distances that are between the UWB tag 100 and the UWB base station 200, the UWB base station 300, and the UWB base station 400 and that are obtained through measurement in Part 1 and the distances that are between the UWB tag 100 and the UWB base station 200, the UWB base station 300, and the UWB base station 400 and that are obtained through re-calculation in Part 3, whether a UWB base station in the UWB base station 200, the UWB base station 300, and the UWB base station 400 is abnormal.

The following separately describes specific implementations of Part 1 to Part 4.

Figure 6A:
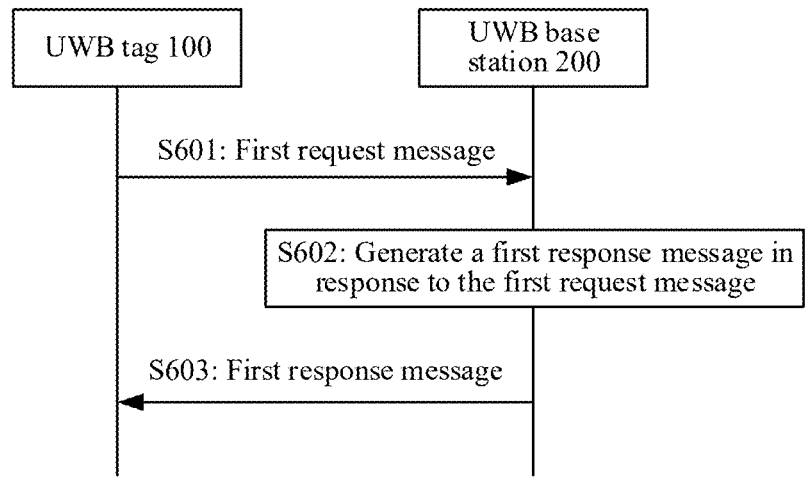
FIG. 6A is a schematic flowchart of interaction between a UWB tag and a UWB base station according to an embodiment of this application.

For Part 1:

For example, FIG. 6A is a schematic flowchart of interaction between a UWB tag and a UWB base station according to an embodiment of this application. The UWB tag may obtain, through measurement, a distance between each UWB base station in the UWB system and the UWB tag by using a procedure of interaction between the UWB tag and the UWB base station shown in FIG. 6A. As shown in FIG. 6A, the procedure of interaction between the UWB tag and the UWB base station may include the following steps.

S601: The UWB tag sends a first request message to the UWB base station.

Correspondingly, the UWB base station receives the first request message.

S602: The UWB base station generates a first response message in response to the first request message.

S603: The UWB base station sends the first response message to the UWB tag.

Correspondingly, the UWB tag receives the first response message.

In the UWB positioning system shown in FIG. 1, that the UWB tag 100 measures a distance between the UWB tag 100 and the UWB base station 200 is used as an example. The first request message in FIG. 6A may be a ranging request message, and the first response message may be a ranging response message. The UWB tag 100 may send the ranging request message to the UWB base station 200, and record a moment (or referred to as a time point) at which the ranging request message is sent. After receiving the ranging request message, the UWB base station 200 may send the ranging response message to the UWB tag 100 in response to the ranging request message. The UWB tag 100 may receive the ranging response message, and record a moment at which the ranging response message is received. Then, the UWB tag 100 may calculate the distance between the UWB base station 200 and the UWB tag 100 based on the time point at which the ranging request message is sent and the time point at which the ranging response message is received, and with reference to propagation speed (which is generally the speed of light) of the ranging request message and the ranging response message.

For example, it is assumed that the moment at which the UWB tag 100 sends the ranging request message to the UWB base station 200 is $t_1$, and the moment at which the UWB tag 100 receives the ranging response message from the UWB base station 200 is $t_2$. The UWB tag 100 may calculate the distance ρ between the UWB base station 200 and the UWB tag 100 according to the following formula (1.1):

$$\rho = \frac{(t_2 - t_1) \times c}{2} \qquad \text{Formula (1.1)}$$

ρ represents the distance that is between the UWB base station 200 and the UWB tag 100 and that is obtained through calculation; and c represents the speed of light, which may be $2.99792458 \times 10^8$ m/s (where * represents a product).

It may be understood that, the meaning of the formula (1.1) is as follows: $(t_2-t_1) \times c$ indicates a sum of a length of a propagation path of the ranging request message and a length of a propagation path of the ranging response message.

$$\frac{(t_2 - t_1) \times c}{2}$$

indicates a halt of the sum of the length of the propagation path of the ranging request message and the length of the propagation path of the ranging response message. Because the propagation speed of the ranging request message and the ranging response message are generally the speed of light, $$\frac{(t_2 - t_1) \times c}{2}$$

may be used as the distance between the UWB base station 200 and the UWB tag 100.

Optionally, in another implementation, the step of calculating the distance between the UWB base station 200 and the UWB tag 100 may alternatively be completed by the UWB base station 200. For example, when the UWB tag 100 sends the ranging request message to the UWB base station 200, the ranging request message may include a timestamp when the ranging request message is sent. After receiving the ranging request message, in response to the ranging request message, the UWB base station 200 may calculate the distance between the UWB base station 200 and the UWB tag 100 based on a timestamp included in the ranging request message, a time point at which the ranging request message is received, and propagation speed (which is generally the speed of light) of the ranging request message, generate the ranging response message, and send the ranging response message to the UWB tag 100. The ranging response message includes the distance that is between the UWB base station 200 and the UWB tag 100 and that is obtained by the UWB base station 200 through calculation. Therefore, the UWB tag 100 may obtain the distance between the UWB base station 200 and the UWB tag 100.

For example, it is assumed that a moment corresponding to the timestamp included in the ranging request message is $t_3$, and a moment at which the UWB base station 200 receives the ranging request message is $t_4$. The UWB base station 200 may obtain the distance ρ between the UWB base station 200 and the UWB tag 100 through calculation according to the following formula (1.2):

$$\rho=(t_4-t_3)\times c \qquad \text{Formula (1.2)}$$

ρ represents the distance that is between the UWB base station 200 and the UWB tag 100 and that is obtained through calculation; and c represents the speed of light, which may be $2.99792458*10^8$ m/s (where * represents a product).

It may be understood that, the meaning of the formula (1.2) is as follows: $(t_4-t_3)\times c$ indicates a sum of a length of a propagation path of the ranging request message. The length of the propagation path of the ranging request message may be used as the distance between the UWB base station 200 and the UWB tag 100.

Optionally, in this embodiment of this application, the UWB tag may send a first request message to each UWB base station every T seconds (where T may be 0.1 second, 0.2 second, 0.3 second, or the like). Each time the UWB tag sends the first request message, the distance between each UWB base station in the UWB positioning system and the UWB tag may be obtained through measurement once. For each measurement process, the UWB tag may detect, according to Part 2 to Part 4, whether a UWB base station in the UWB positioning system is abnormal. In other words, in this embodiment of this application, the UWB tag may detect, every T seconds (same as an interval at which the first request message is sent), whether a UWB base station in the UWB positioning system is abnormal.

In another implementation, the foregoing ranging procedure may alternatively be actively initiated by each UWB base station, and a process of calculating the distance between the UWB base station and the UWB tag may be completed by the UWB base station or the UWB tag. For example, the UWB base station 200 may send the first request message to the UWB tag 100 every T seconds, and record a moment at which the first request message is sent. The UWB tag 100 may send a first response message to the UWB base station 200 in response to the first request message. The UWB base station 200 may calculate the distance between the UWB base station 200 and the UWB tag 100 in a manner similar to the foregoing calculation process of the UWB tag based on the moment at which the first request message is sent, a moment at which the first response message is received, and with reference to propagation speed (which is generally the speed of light) of the first request message and the first response message. Then, the UWB base station 200 may send (for example, send by using a second message) the distance that is between the UWB base station 200 and the UWB tag 100 and that is obtained through calculation to the UWB tag 100. Therefore, the UWB tag 100 may obtain the distance that is between the UWB base station 200 and the UWB tag 100 and that is obtained through measurement. An initiator of the ranging procedure is not limited in embodiments of this application.

For Part 2:

In this embodiment of this application, when the UWB positioning system is deployed, the UWB positioning system may be initialized by using the UWB base station as a positioning center, and a navigation coordinate system of the UWB positioning system is pre-established. Spatial coordinates of each UWB base station in the navigation coordinate system represents a location of the UWB base station in the UWB positioning system. Each UWB base station may send the spatial coordinates of the UWB base station in the navigation coordinate system to the UWB tag. In the UWB base station anomaly detection method, the UWB tag may directly use the spatial coordinates of each UWB base station in the navigation coordinate system to perform subsequent calculation. In other words, after the navigation coordinate system of the UWB positioning system is pre-established, the spatial coordinates of each UWB base station in the UWB positioning system is a known parameter. Correspondingly, the location of the UWB tag in the UWB positioning system obtained through calculation in Part 2 is spatial coordinates of the UWB tag in the navigation coordinate system. It should be noted that, in this embodiment of this application, the spatial coordinates that are of the UWB tag in the navigation coordinate system and that are obtained through calculation in Part 2 is an estimated value (where for details, refer to the following descriptions).

For example, in this embodiment of this application, a process of pre-establishing the navigation coordinate system of the UWB positioning system may be as follows.

In some embodiments, when the UWB positioning system is initialized and the navigation coordinate system of the UWB positioning system is established, a UWB base station of a multi-antenna architecture (for example, a three-antenna architecture or a four-antenna architecture) in the UWB positioning system may be selected as the positioning center. Then, the UWB base station may use a central location of the UWB base station as a coordinate origin (0, 0, 0), and establish a navigation coordinate system (which may also be referred to as a first coordinate system) of the UWB positioning system based on the three-antenna architecture or the four-antenna architecture of the UWB base station. Subsequently, the UWB base station may be directly configured to measure spatial coordinates of another device in the UWB positioning system in the navigation coordinate system, where the another device may include another UWB base station, the UWB tag, and the like.

Figure 6B:
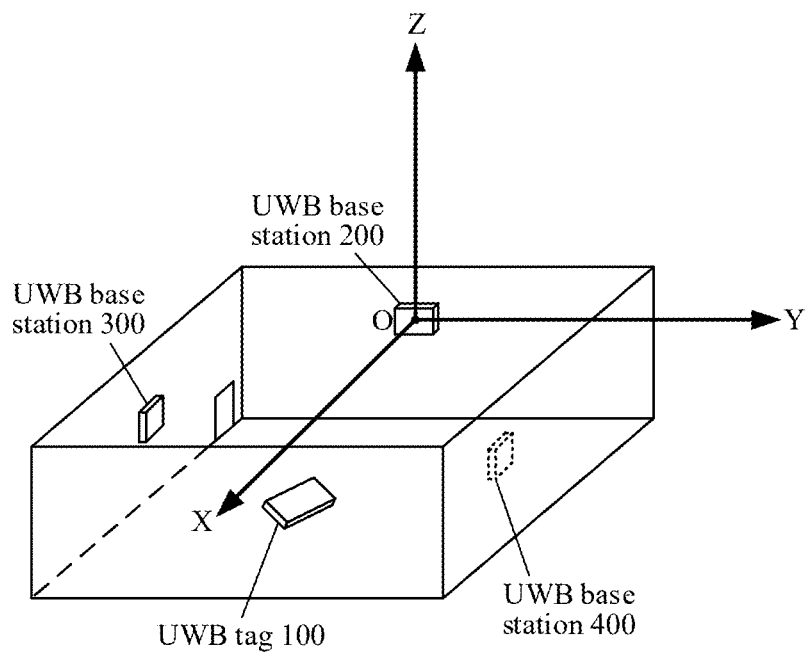
FIG. 6B is a schematic diagram of a first coordinate system established in the UWB positioning system shown in FIG. 1.

The UWB positioning system shown in FIG. 1 is used as an example. FIG. 6B is a schematic diagram of the first coordinate system established in the UWB positioning system shown in FIG. 1. As shown in FIG. 6B, when the UWB base station 200 is of the multi-antenna architecture, the UWB base station 200 may use a central location of the UWB base station 200 as a coordinate origin O (0, 0, 0) of the first coordinate system, and establish an X-axis in any direction through the coordinate origin O (where in FIG. 6B, an example in which the X-axis is perpendicular to a plane of the UWB base station is used). After determining the X-axis, the UWB base station 200 may establish a Y-axis that passes through the coordinate origin O and that is perpendicular to the X-axis. In this case, the UWB base station 200 may determine an XOY plane of the first coordinate system. After the XOY plane of the first coordinate system is determined, the UWB base station 200 may establish a Z-axis that passes through the coordinate origin O and that is perpendicular to the XOY plane, to obtain the complete first coordinate system. In the first coordinate system, the UWB base station 200 may communicate with other devices such as the UWB base station 300, the UWB base station 400, and the UWB tag 100 based on the multi-antenna architecture of the UWB base station 200, to determine vertical distances of central locations of the other devices relative to the coordinate origin O in an X-axis direction, a Y-axis direction, and a Z-axis direction. Therefore, the UWB base station 200 may obtain spatial coordinates of the other devices in the first coordinate system through measurement.

Similarly, when the UWB base station 300 or the UWB base station 400 is of the multi-antenna architecture, the UWB base station 300 or the UWB base station 400 may also establish the first coordinate system of the UWB positioning system in a manner similar to that of the UWB base station 200. Details are not described again.

In some other embodiments, when the UWB positioning system is initialized and the navigation coordinate system of the UWB positioning system is established, if the UWB positioning system does not include a UWB base station of the multi-antenna architecture, the navigation coordinate system (which may also be referred to as a first coordinate system) of the UWB positioning system may alternatively be jointly established based on at least three UWB base stations of a single-antenna architecture in the UWB positioning system. For example, it is assumed that the UWB positioning system includes three UWB base stations of the single-antenna architecture, a Y-axis of the navigation coordinate system may be established on a connection line between central locations of any two UWB base stations, and a Y-axis direction is a direction in which a central location of one UWB base station points to a central location of the other UWB base station (which is not limited in embodiments of this application). An X-axis is established on a line that passes through a central location of the third UWB base station and that is perpendicular to the Y-axis, and the third UWB base station is specified to be located on an XOY plane and on a positive half of the X-axis. In this case, it may be determined that an intersection point of the X-axis and the Y-axis is the coordinate origin O (0, 0, 0) of the navigation coordinate system. Then, a Z-axis may be established in a direction that is perpendicular to the XOY plane and that passes through the coordinate origin O (0, 0, 0), and a specific direction of the Z-axis may not be limited. In this way, the X-axis, the Y-axis, the Z-axis, and the coordinate origin O (0, 0, 0) of the navigation coordinate system of the UWB positioning system may be obtained. Then, the spatial coordinates of each UWB base station in the navigation coordinate system may be determined by measuring distances between the three UWB base stations. Subsequently, spatial coordinates of other devices in the UWB positioning system in the navigation coordinate system may be determined by measuring distances between the other devices and the three UWB base stations. The other devices may also include another UWB base station, the UWB tag, and the like.

Figure 6C:
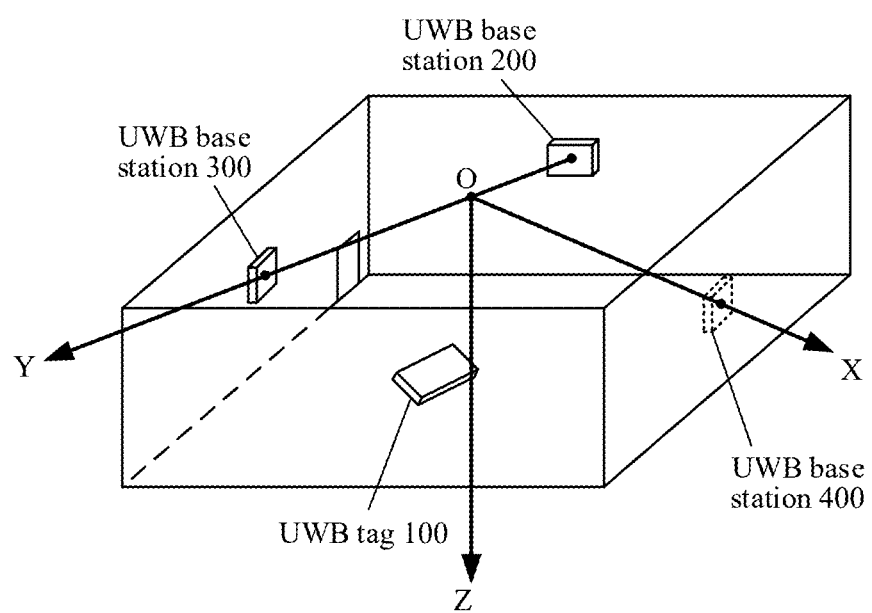
FIG. 6C is another schematic diagram of a first coordinate system established in the UWB positioning system shown in FIG. 1.

Similarly, the UWB positioning system shown in FIG. 1 is used as an example. FIG. 6C is another schematic diagram of the first coordinate system established in the UWB positioning system shown in FIG. 1. As shown in FIG. 6C, it is assumed that the UWB base station 200, the UWB base station 300, and the UWB base station 400 in the UWB positioning system shown in FIG. 1 are all of the single-antenna architecture, a Y-axis of the first coordinate system may be established on a connection line between a central location of the UWB base station 200 and a central location of the UWB base station 300, and a Y-axis direction may be a direction in which the central location of the UWB base station 200 points to the central location of the UWB base station 300. Then, an X-axis may be established on a line that passes through a central location of the UWB base station 400 and that is perpendicular to the Y-axis, and the UWB base station 400 is specified to be located on an XOY plane and on a positive half of the X-axis. In this case, it may be determined that an intersection point of the X-axis and the Y-axis is the coordinate origin O (0, 0, 0) of the first coordinate system, to obtain the XOY plane of the first coordinate system. After the XOY plane of the first coordinate system is determined, a Z-axis may be established in a direction that is perpendicular to the XOY plane and that passes through the coordinate origin O (0, 0, 0), to obtain the complete first coordinate system. In the first coordinate system, spatial coordinates of the UWB base station 200, the UWB base station 300, and the UWB base station 400 in the first coordinate system may be determined by measuring distances between the UWB base station 200, the UWB base station 300, and the UWB base station 400. Spatial coordinates of another device in the first coordinate system may be determined by measuring distances between the another device and the UWB base station 200, the UWB base station 300, and the UWB base station 400.

It should be noted that, in embodiments of this application, a process of initializing the UWB positioning system and establishing the navigation coordinate system is not limited, provided that it is ensured that the UWB tag and the UWB base station calculate their own spatial coordinates based on a same navigation coordinate system.

Optionally, when a new UWB base station is added to the UWB positioning system, the UWB positioning system may further allocate a communication address to the newly added UWB base station, and determine spatial coordinates of the newly added UWB base station in the navigation coordinate system.

For Part 3:

The UWB tag may obtain a distance between each UWB base station in the UWB system and the UWB tag through re-calculation based on the spatial coordinates of each UWB base station in the navigation coordinate system and the spatial coordinates that are of the UWB tag in the navigation coordinate system and that are obtained through calculation in Part 2.

For Part 4:

The UWB tag may determine, based on the distance that is between each UWB base station and the UWB tag and that is obtained through measurement in Part 1 and the distance that is between each UWB base station in the UWB system and the UWB tag and that is obtained through re-calculation in Part 3, whether a UWB base station in the UWB positioning system is abnormal.

Figures 1, 7A:
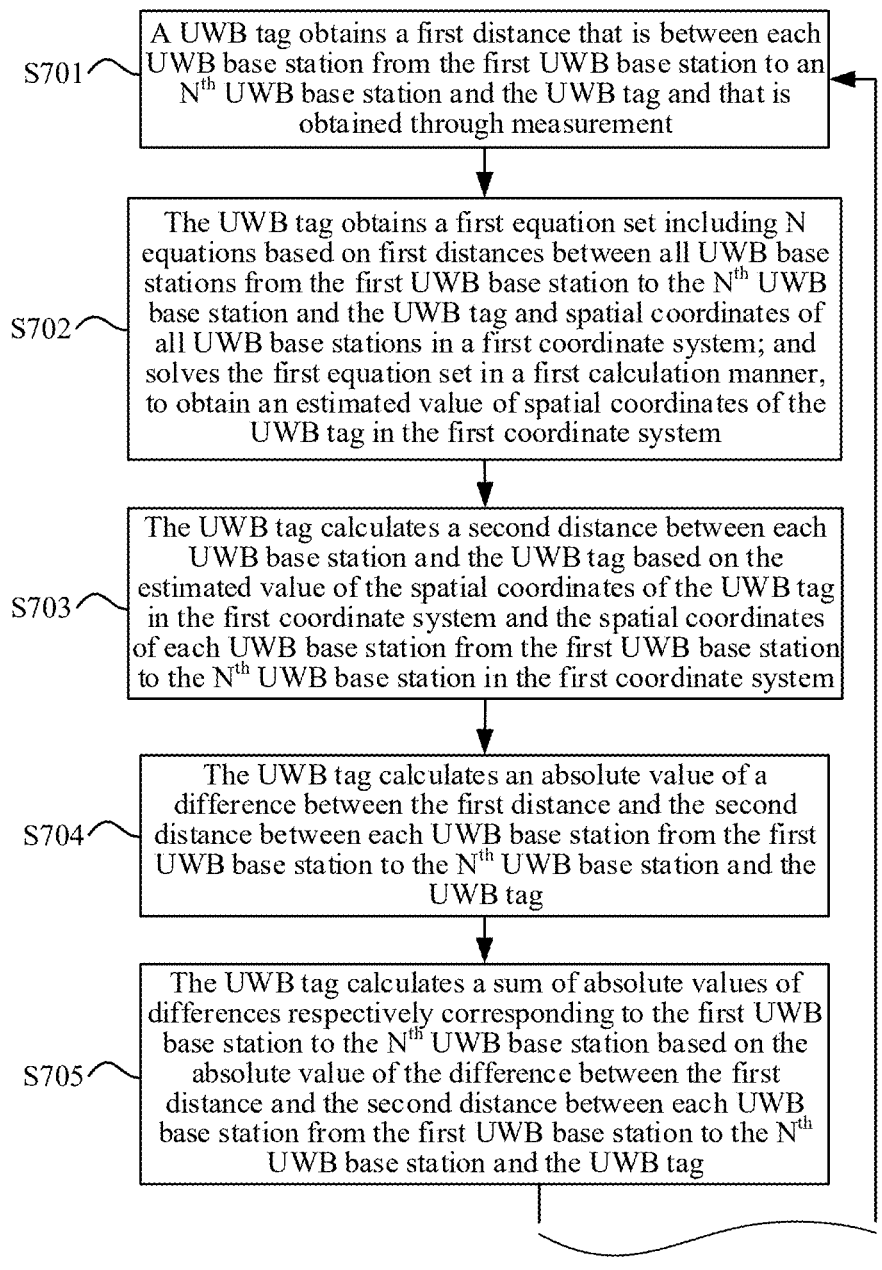
Figures 2, 7A:
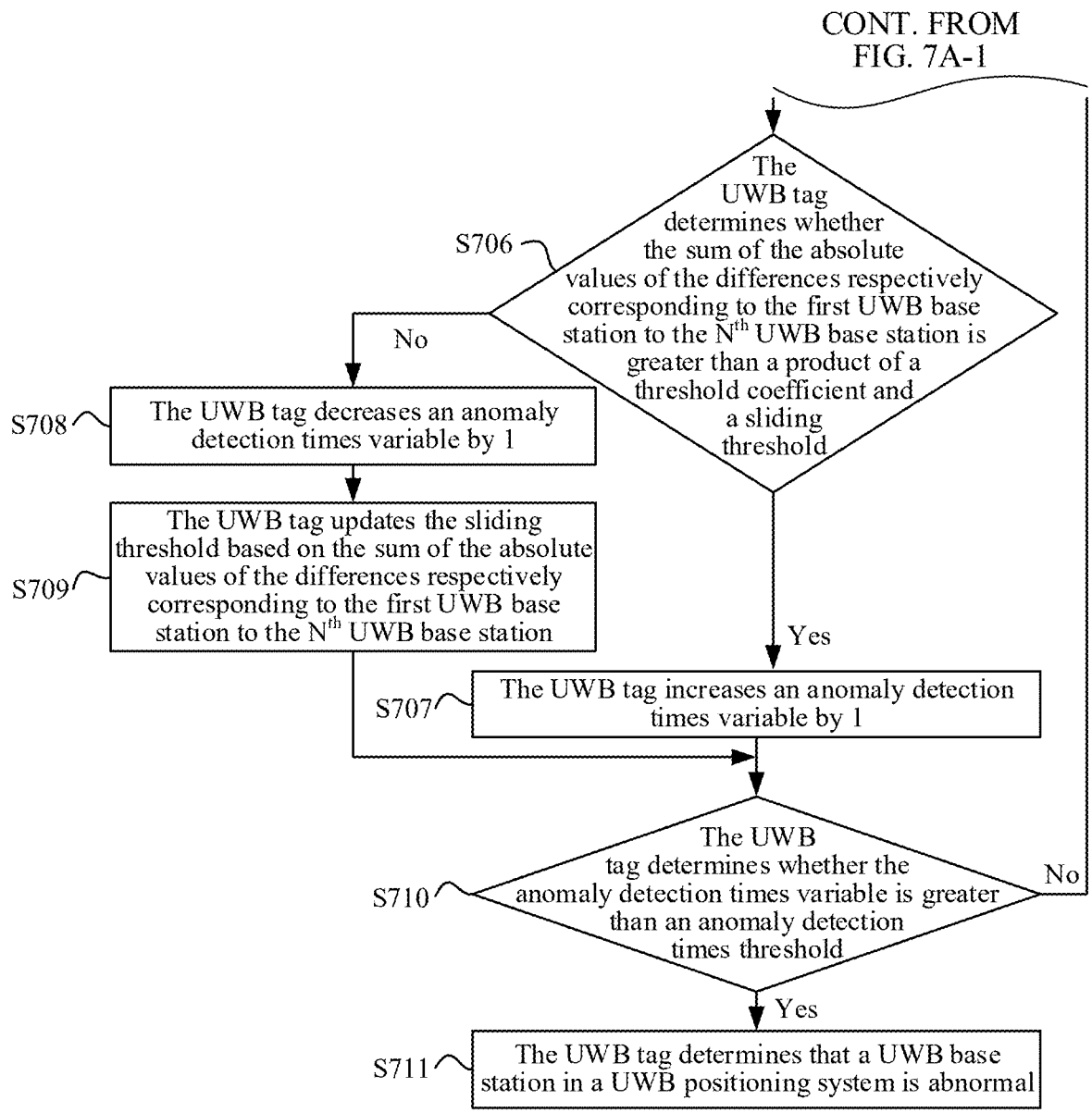

With reference to a procedure shown in FIG. 7A-1 and FIG. 7A-2, the following uses an example in which the UWB positioning system includes N (where N is a positive integer greater than 2) UWB base stations to describe complete implementation logic of Part 1 to Part 4 of the UWB base station anomaly detection method.

It should be noted that, in the following descriptions, for ease of differentiation, a distance that is between each UWB base station in the UWB positioning system and the UWB tag and that is obtained through measurement in Part 1 may be referred to as a first distance, and a distance that is between each UWB base station in the UWB system and the UWB tag and that is obtained through re-calculation in Part 3 may be referred to as a second distance. The N UWB base stations included in the UWB positioning system may be sequentially named as a first UWB base station to an $N^{th}$ UWB base station.

FIG. 7A-1 and FIG. 7A-2 are a schematic flowchart of a UWB base station anomaly detection method according to an embodiment of this application. As shown in FIG. 7A-1 and FIG. 7A-2, the UWB base station anomaly detection method may include S701 to S711.

S701: A UWB tag obtains the first distance that is between each UWB base station from the first UWB base station to the $N^{th}$ UWB base station and the UWB tag and that is obtained through measurement.

Specifically, in the UWB positioning system shown in FIG. 1, N may be 3. The UWB tag 100 may separately send a ranging request message to the UWB base station 200, the UWB base station 300, and the UWB base station 400. After receiving the ranging request message from the UWB tag 100, the UWB base station 200, the UWB base station 300, and the UWB base station 400 may measure a distance from the UWB tag 100 to the UWB base station 200, the UWB base station 300, and the UWB base station 400, and return the distance to the UWB tag 100.

Optionally, the distance between the UWB tag 100 and each UWB base station may alternatively be obtained in the foregoing manner provided in this application.

S702: The UWB tag obtains a first equation set including N equations based on first distances between all UWB base stations from the first UWB base station to the $N^{th}$ UWB base station and the UWB tag and spatial coordinates of all UWB base stations in a first coordinate system; and solves the first equation set in a first calculation manner, to obtain an estimated value of the spatial coordinates of the UWB tag in the first coordinate system.

For the first distance between each UWB base station from the first UWB base station to the $N^{th}$ UWB base station and the UWB tag, refer to Part 1. The first coordinate system is the navigation coordinate system of the UWB positioning system. Refer to Part 2. The spatial coordinates of each UWB base station in the first coordinate system is a known parameter.

For example, it is assumed that spatial coordinates of the first UWB base station in the first coordinate system are $(x^{(1)}, y^{(1)}, z^{(1)})$, and a first distance between the first UWB base station and the UWB tag is $\rho^{(1)}$; spatial coordinates of a second UWB base station in the first coordinate system are $(x^{(2)}, y^{(2)}, z^{(2)})$, and a first distance between the second UWB base station and the UWB tag is $\rho^{(2)}$; and by analogy, spatial coordinates of the $N^{th}$ UWB base station in the first coordinate system are $(x^{(n)}, y^{(n)}, z^{(n)})$, and a first distance between the $N^{th}$ UWB base station and the UWB tag is $\rho^{(n)}$. The UWB tag may establish the first equation set based on the first distances between all UWB base stations from the first UWB base station to the $N^{th}$ UWB base station and the UWB tag and the spatial coordinates of all UWB base stations in the first coordinate system. The first equation set is an equation set (1), and the first equation set is a nonlinear equation set. The first equation set includes N nonlinear equations that are in a one-to-one correspondence with the first UWB base station to the $N^{th}$ UWB base station.

$$\sqrt{(x^{(1)}-x)^2+(y^{(1)}-y)^2+(z^{(1)}-z)^2}=\rho^{(1)}$$

$$\sqrt{(x^{(2)}-x)^2+(y^{(2)}-y)^2+(z^{(2)}-z)^2}=\rho^{(2)}$$

$$\sqrt{(x^{(n)}-x)^2+(y^{(n)}-y)^2+(z^{(n)}-z)^2}=\rho^{(n)}$$

(x, y, z) is an unknown parameter, and represents the spatial coordinates of the UWB tag in the first coordinate system.

After establishing the first equation set, the UWB tag may calculate values of x, y and z according to the first equation set, and (x, y, z) represents an estimated value of the spatial coordinates of the UWB tag in the first coordinate system. In this embodiment of this application, a process of calculating the values of x, y and z according to the first equation set may also be referred to as a positioning calculation process of the UWB tag.

It should be noted that spatial coordinates of the UWB base stations, the UWB tag, and the like in the first coordinate system are spatial coordinates of central locations of the UWB base stations, the UWB tag, and the like in the first coordinate system.

It should be noted that, in this embodiment of this application, the UWB positioning system includes at least three (including three) UWB base stations. In this case, the UWB tag can obtain the estimated value of the spatial coordinates of the UWB tag in the first coordinate system through positioning calculation according to the first equation set.

In this embodiment of this application, that the UWB tag solves the first equation set in the first calculation manner may include: calculating the values of x, y and z according to the first equation set by using the Newton's method. In each Newton iteration, a least square method is used to solve a linear matrix equation in a Newton iteration cycle. The following describes an example of the process of calculating the values of x, y and z according to the first equation set by using the Newton iteration method.

First, before performing Newton iteration, an initial estimated value $\rho_0=(x_0, y_0, z_0)$ of the spatial coordinates of the UWB tag in the first coordinate system needs to be provided. If the estimated value of the spatial coordinates of the UWB tag in the first coordinate system is successfully obtained through calculation at a previous positioning moment, in this time of positioning, the initial estimated value may be the estimated value that is of the spatial coordinates of the UWB tag in the first coordinate system and that is obtained through calculation at the previous positioning moment. If the current positioning is initial positioning (namely, the first positioning) of the UWB tag, each coordinate component of the initial estimated value may be set to 0, that is, the initial estimated value may be $\rho_0=(0,0,0)$.

Then, it is set that k represents a quantity of Newton iterations being performed in the current positioning calculation process, k−1 represents a quantity of Newton iterations completed in the current positioning calculation process, and k=1 represents the first Newton iteration.

In a $k^{th}$ Newton iteration in the positioning calculation process, nonlinear equations in the first equation set (namely, the equation set (1)) may be linearized at $p_{k-1}=(x_{k-1}, y_{k-1}, z_{k-1})$.

For example, an equation corresponding to an $i^{th}$ UWB base station (where i is a positive integer greater than or equal to 1 and less than or equal to N) in the first equation set may be described in the following equation (1):

$$\sqrt{(x^{(i)}-x)^2+(y^{(i)}-y)^2+(z^{(i)}-z)^2}=\rho^{(i)} \qquad \text{Equation (1)}$$

For the equation (1), a nonlinear function corresponding to the equation (1) may be established. The nonlinear function is shown in the following function (1), and may be represented as $r^{(i)}(x, y, z)$.

$$r^{(i)}(x,y,z)=\sqrt{(x^{(i)}-x)^2+(y^{(i)}-y)^2+(z^{(i)}-z)^2} \qquad \text{Function (1)}$$

For the function (1), $r^{(i)}(x, y, z)=\rho^{(i)}$ represents a curved surface (spherical surface) formed by all points that are in the first coordinate system and that are at a distance of $\rho^{(i)}$ from the $i^{th}$ UWB base station.

For the function (1), a first-order Taylor expansion of $r^{(i)}(x, y, z)$ at $p_{k-1}=(x_{k-1}, y_{k-1}, z_{k-1})$ is shown in the following Taylor expansion (1):

$$r^{(i)}(x_{k-1}, y_{k-1}, z_{k-1}) + \\ \frac{\partial r^{(i)}(x_{k-1}, y_{k-1}, z_{k-1})}{\partial x}(x-x_{k-1}) + \\ \frac{\partial r^{(i)}(x_{k-1}, y_{k-1}, z_{k-1})}{\partial y}(y-y_{k-1}) + \\ \frac{\partial r^{(i)}(x_{k-1}, y_{k-1}, z_{k-1})}{\partial z}(z-z_{k-1}) \qquad \text{Taylor expansion (1)}$$

$$\frac{\partial r^{(i)}(x_{k-1}, y_{k-1}, z_{k-1})}{\partial x}$$

is a value of a partial derivative of $r^{(i)}(x, y, z)$ with respect to x at a point $(x_{k-1}, y_{k-1}, z_{k-1})$, and a physical meaning of $$\frac{\partial r^{(i)}(x_{k-1}, y_{k-1}, z_{k-1})}{\partial x}$$

is a tangent value of an angle between an X-axis and a tangent plane of the curved surface $r^{(i)}(x, y, z)=\rho^{(i)}$ at the point $(x_{k-1}, y_{k-1}, z_{k-1})$.

$$\frac{\partial r^{(i)}(x_{k-1}, y_{k-1}, z_{k-1})}{\partial y}$$

is a value of a partial derivative of $r^{(i)}(x, y, z)$ with respect to y at the point $(x_{k-1}, y_{k-1}, z_{k-1})$, and a physical meaning of $$\frac{\partial r^{(i)}(x_{k-1}, y_{k-1}, z_{k-1})}{\partial y}$$

is a tangent value of an angle between a Y-axis and a tangent plane of the curved surface $r^{(i)}(x, y, z)=\rho^{(i)}$ at the point $(x_{k-1}, y_{k-1}, z_{k-1})$.

$$\frac{\partial r^{(i)}(x_{k-1}, y_{k-1}, z_{k-1})}{\partial z}$$

is a value of a partial derivative of $r^{(i)}(x, y, z)$ with respect to z at the point $(x_{k-1}, y_{k-1}, z_{k-1})$, and a physical meaning of $$\frac{\partial r^{(i)}(x_{k-1}, y_{k-1}, z_{k-1})}{\partial z}$$

is a tangent value of an angle between a Z-axis and a tangent plane of the curved surface $r^{(i)}(x, y, z)=\rho^{(i)}$ at the point $(x_{k-1}, y_{k-1}, z_{k-1})$.

Figure 7B:
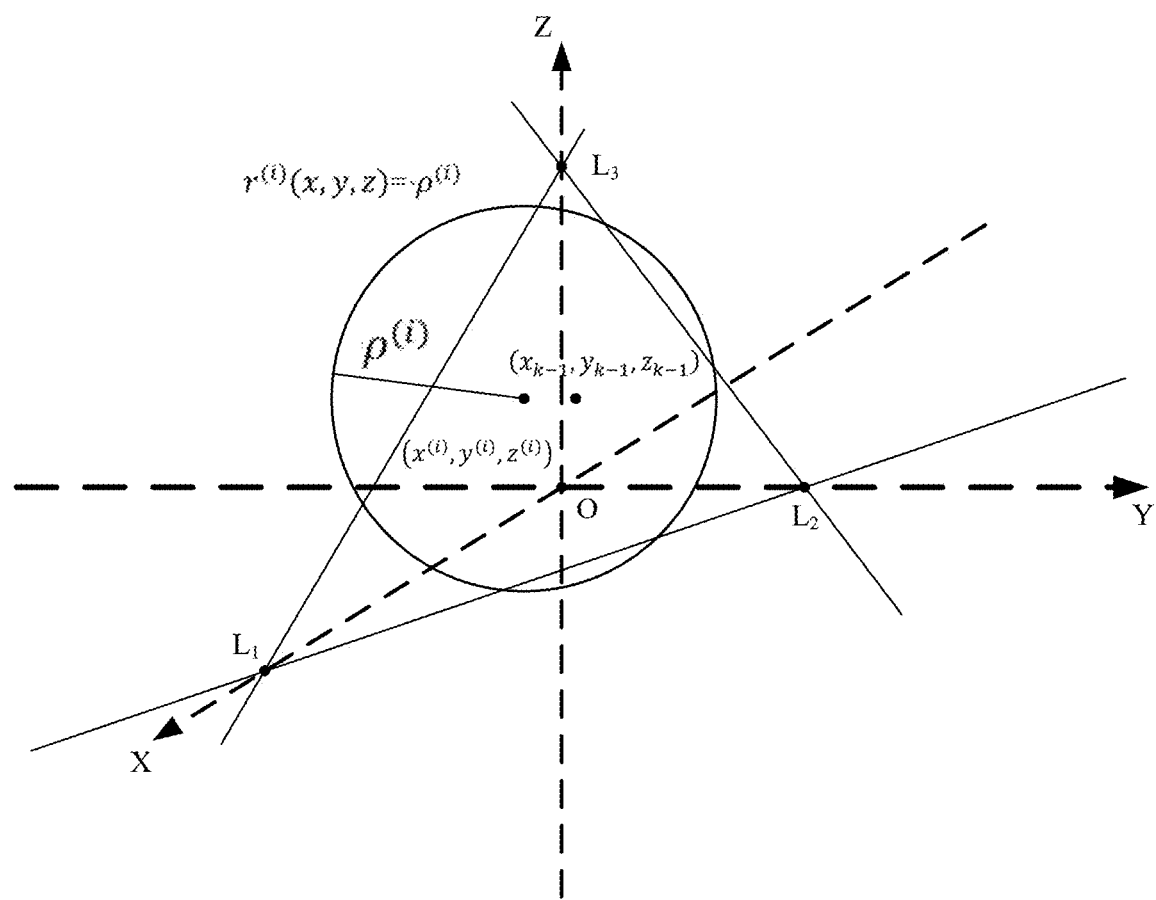
FIG. 7B is a schematic diagram of a curve $r^{(i)}(x, y, z) = \rho^{(i)}$ according to an embodiment of this application.

For example, FIG. 7B is a schematic diagram of the curve $r^{(i)}(x, y, z)=\rho^{(i)}$ according to an embodiment of this application. As shown in FIG. 7B, a center of the curved surface $r^{(i)}(x, y, z)=\rho^{(i)}$ is a point $(x^{(i)}, y^{(i)}, z^{(i)})$. A distance between any point on the curved surface $r^{(i)}(x, y, z)=\rho^{(i)}$ and the point $(x^{(i)}, y^{(i)}, z^{(i)})$ is $\rho^{(i)}$. A tangent plane of the curved surface $r^{(i)}(x, y, z)=\rho^{(i)}$ at the point $(x_{k-1}, y_{k-1}, z_{k-1})$ is a plane formed by a point $L_1$, a point $L_2$, and a point $L_3$. A physical meaning of $$\frac{\partial r^{(i)}(x_{k-1}, y_{k-1}, z_{k-1})}{\partial x}$$

is a tangent value of an angle between an X-axis and a plane formed by the point $L_1$, the point $L_2$, and the point $L_3$. A physical meaning of $$\frac{\partial r^{(i)}(x_{k-1}, y_{k-1}, z_{k-1})}{\partial y}$$

is a tangent value of an angle between a Y-axis and the plane formed by the point $L_1$, the point $L_2$, and the point $L_3$. A physical meaning of $$\frac{\partial r^{(i)}(x_{k-1}, y_{k-1}, z_{k-1})}{\partial z}$$

is a tangent value of an angle between a Z-axis and the plane formed by the point $L_1$, the point $L_2$, and the point $L_3$.

The following formula (2) may be derived from $$\frac{\partial r^{(i)}(x_{k-1}, y_{k-1}, z_{k-1})}{\partial x}$$

in the Taylor expansion (1):

$$\frac{\partial r^{(i)}}{\partial x} = \frac{-(x^{(i)}-x_{k-1})}{\sqrt{(x^{(i)}-x_{k-1})^2+(z^{(i)}-z_{k-1})^2}} = \frac{-(x^{(i)}-x_{k-1})}{r^{(i)}} \qquad \text{Formula (2)}$$

The following formula (3) may be derived from $$\frac{\partial r^{(i)}(x_{k-1}, y_{k-1}, z_{k-1})}{\partial y}$$

in the Taylor expansion (1):

$$\frac{\partial r^{(i)}}{\partial y} = \frac{-(y^{(i)} - y_{k-1})}{\sqrt{(x^{(i)} - x_{k-1})^2 + (y^{(i)} - y_{k-1})^2 + (z^{(i)} - z_{k-1})^2}} = \frac{-(y^{(i)} - y_{k-1})}{r^{(i)}} \quad \text{Formula (3)}$$

The following formula (4) may be derived from $$\frac{\partial r^{(i)}(x_{k-1}, y_{k-1}, z_{k-1})}{\partial z}$$

in the Taylor expansion (1):

$$\frac{\partial r^{(i)}}{\partial z} = \frac{-(z^{(i)} - z_{k-1})}{\sqrt{(x^{(i)} - x_{k-1})^2 + (y^{(i)} - y_{k-1})^2 + (z^{(i)} - z_{k-1})^2}} = \frac{-(z^{(i)} - z_{k-1})}{r^{(i)}} \quad \text{Formula (4)}$$

Figure 8:
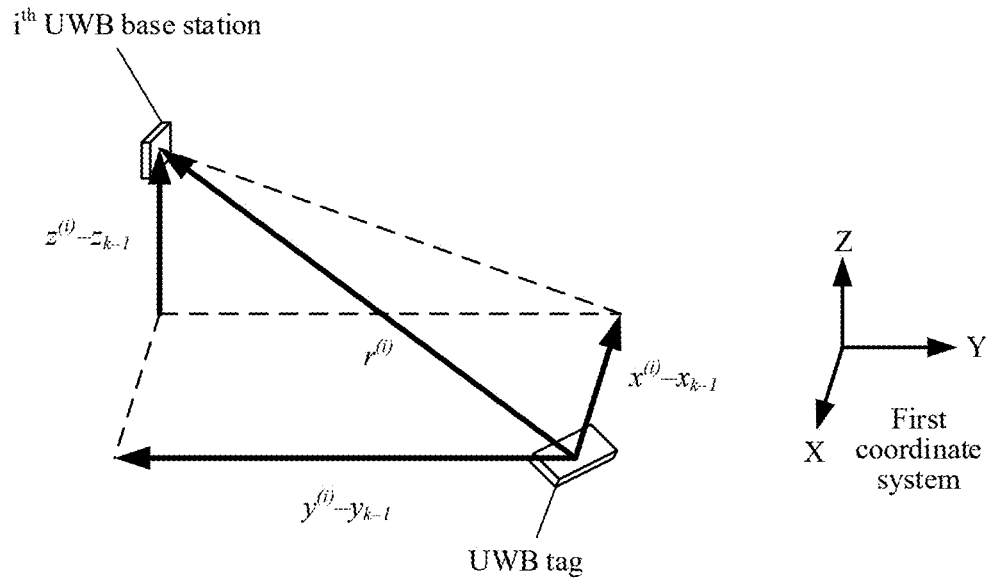
FIG. 8 is a schematic diagram of a relative location relationship between an $i^{th}$ UWB base station and a UWB tag in a first coordinate system according to an embodiment of this application.

For example, FIG. 8 is a schematic diagram of a relative location relationship between the $i^{th}$ UWB base station and the UWB tag in the first coordinate system according to an embodiment of this application. As shown in FIG. 8, in the foregoing formula (2) to formula (4), $r^{(i)}$ represents a length of a vector from a location of the UWB tag (namely, a central location of the UWB tag) to a location of the $i^{th}$ UWB base station (namely, a central location of the $i^{th}$ UWB base station); $(x^{(i)} - x_{k-1})$ represents a length of a component of the vector on the X-axis in the first coordinate system; $(y^{(i)} - y_{k-1})$ represents a length of a component of the vector on the Y-axis in the first coordinate system; and $(z^{(i)} - z_{k-1})$ represents a length of a component of the vector on the Z-axis in the first coordinate system.

Therefore, $$\frac{(x^{(i)} - x_{k-1})}{r^{(i)}}$$

in the foregoing formula (2) represents a length of a component of a unit vector between the location of the UWB tag and the location of the $i^{th}$ UWB base station on the X-axis.

$$\frac{(y^{(i)} - y_{k-1})}{r^{(i)}}$$

in the foregoing formula (3) represents a length of a component of the unit vector between the location of the UWB tag and the location of the $i^{th}$ UWB base station on the Y-axis.

$$\frac{(z^{(i)} - z_{k-1})}{r^{(i)}}$$

in the foregoing formula (4) represents a length of a component of the unit vector between the location of the UWB tag and the location of the $i^{th}$ UWB base station on the Z-axis.

For example, the length of the unit vector between the location of the UWB tag and the location of the $i^{th}$ UWB base station may be represented as $I^{(i)}$, and a value of $I^{(i)}$ may be 1. The length of the component of the unit vector between the location of the UWB tag and the location of the $i^{th}$ UWB base station on the X-axis may be expressed as $I_x^{(i)}$; the length of the component of the unit vector between the location of the UWB tag and the location of the $i^{th}$ UWB base station on the Y-axis may be expressed as $I_y^{(i)}$; and the length of the component of the unit vector between the location of the UWB tag and the location of the $i^{th}$ UWB base station on the Z-axis may be expressed as $I_z^{(i)}$.

It may be understood that, when the value of $I^{(i)}$ is 1, $(I_x^{(i)})^2 + (I_y^{(i)})^2 + (I_z^{(i)})^2 = 1$.

For example, when $$(x^{(i)}, y^{(i)}, z^{(i)}) = \left(\frac{2\sqrt{3}}{3}, \frac{\sqrt{3}}{3}, \frac{\sqrt{6}}{3}\right)$$

and $(x_{k-1}, y_{k-1}, z_{k-1}) = \left(\frac{\sqrt{3}}{3}, \frac{\sqrt{3}}{3}, 0\right)$, a value of $I_x^{(i)}$ is $\sqrt{3}/3$ a value of $I_y^{(i)}$ is 0, and a value of $I_z^{(i)}$ is $\sqrt{6}/3$, where $$\left(\frac{\sqrt{3}}{3}\right)^2 + (0)^2 + \left(\frac{\sqrt{6}}{3}\right)^2 = 1.$$

When the length of the unit vector between the location of the UWB tag and the location of the $i^{th}$ UWB base station is expressed as $I^{(i)}$, and the lengths of the components of the unit vector between the location of the UWB tag and the location of the $i^{th}$ UWB base station on the X-axis, the Y-axis, and the Z-axis are respectively expressed as $I_x^{(i)}$, $I_y^{(i)}$, and $I_z^{(i)}$:

The following formula (5) may be deduced according to the foregoing formula (2):

$$\frac{\partial r^{(i)}}{\partial x} = \frac{-(x^{(i)} - x_{k-1})}{r^{(i)}} = -I_x^{(i)} \quad \text{Formula (5)}$$

In other words, the following formula (6) may be deduced according to the foregoing formula (3):

$$\frac{\partial r^{(i)}}{\partial y} = \frac{-(y^{(i)} - y_{k-1})}{r^{(i)}} = -I_y^{(i)} \quad \text{Formula (6)}$$

The following formula (7) may be deduced according to the foregoing formula (4):

$$\frac{\partial r^{(i)}}{\partial z} = \frac{-(z^{(i)} - z_{k-1})}{r^{(i)}} = -I_z^{(i)} \quad \text{Formula (7)}$$

The following formula (8) may be deduced according to the foregoing formula (5) to formula (7):

$$\begin{bmatrix} \frac{\partial r^{(i)}}{\partial x} \\ \frac{\partial r^{(i)}}{\partial y} \\ \frac{\partial r^{(i)}}{\partial z} \end{bmatrix} = \frac{-1}{r(i)} \begin{bmatrix} x^{(i)} - x_{k-1} \\ y^{(i)} - y_{k-1} \\ z^{(i)} - z_{k-1} \end{bmatrix} = -I(i) = \begin{bmatrix} -I_x^{(i)} \\ -I_y^{(i)} \\ -I_z^{(i)} \end{bmatrix} \quad \text{Formula (8)}$$

According to the foregoing formula (8) and the Taylor expansion (1), the foregoing equation (1) may be approximately converted into the following equation (2):

$$r^{(i)}(x_{k-1}, y_{k-1}, z_{k-1}) + \begin{bmatrix} -I_x^{(i)} & -I_y^{(i)} & -I_z^{(i)} \end{bmatrix} \begin{bmatrix} x - x_{k-1} \\ y - y_{k-1} \\ z - z_{k-1} \end{bmatrix} = \rho^{(i)} \quad \text{Equation (2)}$$

The equation (2) is a linear equation that is expressed in a matrix form and that is obtained by linearizing the equation (1) at $p_{k-1} = (x_{k-1}, y_{k-1}, z_{k-1})$.

Similarly, each nonlinear equation in the first equation set (namely, the equation set (1)) may be linearized at $p_{k-1} = (x_{k-1}, y_{k-1}, z_{k-1})$, to obtain a linear equation that is corresponding to each nonlinear equation in the equation set (1) and that is expressed in the matrix form.

For example, after the N nonlinear equations that are in a one-to-one correspondence with the first UWB base station to the $N^{th}$ UWB base station and that are in the equation set (1) are linearized at $p_{k-1} = (x_{k-1}, y_{k-1}, z_{k-1})$, the foregoing equation set (1) may be approximately converted into the following equation set (2):

$$r^{(1)}(x_{k-1}, y_{k-1}, z_{k-1}) + \begin{bmatrix} -I_x^{(1)} & -I_y^{(1)} & -I_z^{(1)} \end{bmatrix} \begin{bmatrix} x - x_{k-1} \\ y - y_{k-1} \\ z - z_{k-1} \end{bmatrix} = \quad \text{Equation set (2)}$$
$$\rho^{(1)}$$

$$r^{(2)}(x_{k-1}, y_{k-1}, z_{k-1}) + \begin{bmatrix} -I_x^{(2)} & -I_y^{(2)} & -I_z^{(2)} \end{bmatrix} \begin{bmatrix} x - x_{k-1} \\ y - y_{k-1} \\ z - z_{k-1} \end{bmatrix} = \rho^{(2)}$$

...

$$r^{(n)}(x_{k-1}, y_{k-1}, z_{k-1}) + \begin{bmatrix} -I_x^{(n)} & -I_y^{(n)} & -I_z^{(n)} \end{bmatrix} \begin{bmatrix} x - x_{k-1} \\ y - y_{k-1} \\ z - z_{k-1} \end{bmatrix} = \rho^{(n)}$$

The foregoing equation set (2) may be further converted into the following equation set (3) to be expressed in the matrix form:

$$\begin{bmatrix} r^{(1)}(x_{k-1}, y_k, z_{k-1}) \\ r^{(2)}(x_{k-1}, y_k, z_{k-1}) \\ ... \\ r^{(n)}(x_{k-1}, y_k, z_{k-1}) \end{bmatrix} + \quad \text{Equation set (3)}$$

$$\begin{bmatrix} -I_x^{(1)} & -I_y^{(1)} & -I_z^{(1)} \\ -I_x^{(2)} & -I_y^{(2)} & -I_z^{(2)} \\ -I_x^{(n)} & -I_y^{(n)} & -I_z^{(n)} \end{bmatrix} \begin{bmatrix} x - x_{k-1} \\ y - y_{k-1} \\ z - z_{k-1} \end{bmatrix} = \begin{bmatrix} \rho^{(1)} \\ \rho^{(2)} \\ \rho^{(n)} \end{bmatrix}$$

The equation set (3) may be referred to as a second equation set expressed in the matrix form obtained by linearizing the first equation set.

For the second equation set, it may be set that $$G = \begin{bmatrix} -I_x^{(1)} & -I_y^{(1)} & -I_z^{(1)} \\ -I_x^{(2)} & -I_y^{(2)} & -I_z^{(2)} \\ ... & ... & ... \\ -I_x^{(n)} & -I_y^{(n)} & -I_z^{(n)} \end{bmatrix},$$

$$\Delta p_{k-1} = \begin{bmatrix} x - x_{k-1} \\ y - y_{k-1} \\ z - z_{k-1} \end{bmatrix} = \begin{bmatrix} \Delta x_{k-1} \\ \Delta y_{k-1} \\ \Delta z_{k-1} \end{bmatrix},$$

$$\text{and } b = \begin{bmatrix} \rho^{(1)} - r^{(1)}(x_{k-1}, y_k, z_{k-1}) \\ \rho^{(2)} - r^{(2)}(x_{k-1}, y_k, z_{k-1}) \\ ... \\ \rho^{(n)} - r^{(n)}(x_{k-1}, y_k, z_{k-1}) \end{bmatrix}.$$

In this case, the second equation set may be converted into a linear matrix equation shown in the following formula (9). G may be referred to as a Jacobian matrix or a geometric matrix.

$$G \cdot \Delta p_{k-1} = b \quad \text{Formula (9)}$$

It may be understood that the foregoing formula (9) is actually a variant of the equation set (3), and the formula (9) also includes N equations in a one-to-one correspondence with the first UWB base station to the $N^{th}$ UWB base station.

The $i^{th}$ UWB base station is used as an example, an equation corresponding to the $i^{th}$ UWB base station in the foregoing formula (0.9) may be shown in the following equation (3):

$$\begin{bmatrix} -I_x^{(i)} & -I_y^{(i)} & -I_z^{(i)} \end{bmatrix} \begin{bmatrix} \Delta x_{k-1} \\ \Delta y_{k-1} \\ \Delta z_{k-1} \end{bmatrix} = \begin{bmatrix} \rho^{(i)} - r(i)(x_{k-1}, y_{k-1}, z_{k-1}) \end{bmatrix} \quad \text{Equation (3)}$$

A meaning of the foregoing equation (3) is as follows: A projection of a displacement $(\Delta x_{k-1}, \Delta y_{k-1}, \Delta z_{k-1})$ of the UWB tag in the $k^{th}$ Newton iteration in a direction of a connection line from the $i^{th}$ UWB base station to the position of the UWB tag is equal to a distance change between the $i^{th}$ UWB base station and the UWB tag caused by the displacement.

Figure 9:
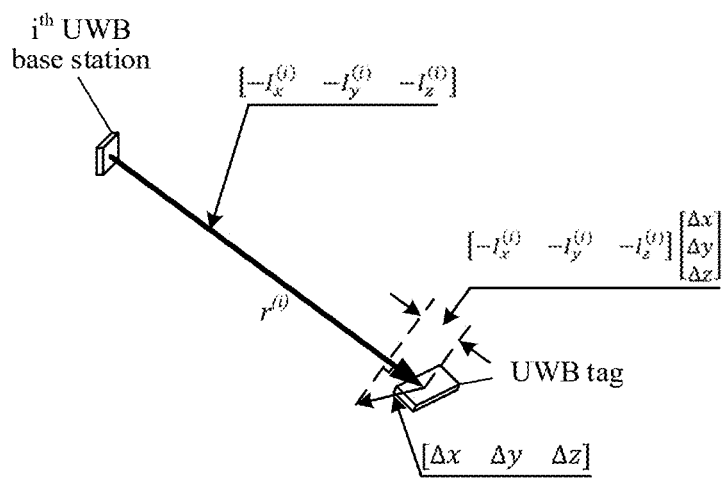
FIG. 9 is another schematic diagram of a relative location relationship between an $i^{th}$ UWB base station and a UWB tag in a first coordinate system according to an embodiment of this application.

For example, FIG. 9 is a another schematic diagram of a relative location relationship between the $i^{th}$ UWB base station and the UWB tag in the first coordinate system according to an embodiment of this application. As shown in FIG. 9, a meaning of the foregoing equation (3) corresponding to the $i^{th}$ UWB base station in the foregoing formula (0.9) is as follows: A projection of a displacement $(\Delta x_{k-1}, \Delta y_{k-1}, \Delta z_{k-1})$ of the UWB tag in the $k^{th}$ Newton iteration in a direction of a connection line from the $i^{th}$ UWB base station to the position of the UWB tag is equal to a distance change between the $i^{th}$ UWB base station and the UWB tag caused by the displacement.

Each time Newton iteration is performed, the linearized matrix equation shown in the foregoing formula (9) may be solved and iterated by using the least square method.

For example, for the linearized matrix equation shown in the foregoing formula (9), a solution $\Delta p$ of the least square method shown in the following formula (10) may be obtained by applying a solution formula of the least square method. A specific process of determining a solution $\Delta p$ of the least square method according to the solution formula of the least square method is a mature algorithm. For example, refer to: Xiao Mingyao. Theory and Application of Matrix Least Squares. Beijing: National Institute of Metrology, China, 1978. Details are not described herein again.

$$\Delta p = (G^T G)^{-1} G^T b \quad \text{Formula (10)}$$

For example, $\Delta p$ obtained through calculation in the k−1$^{th}$ Newton iteration may be represented as $\Delta p_{k-1}$.

After $\Delta p_{k-1}$ is obtained through calculation in the k−1$^{th}$ Newton iteration, an updated estimated value of the spatial coordinates $p_k$ of the UWB tag may be obtained according to the following formula (11):

$$p_k = p_{k-1} + \Delta p_{k-1} \quad \text{Formula (11)}$$

$p_{k-1}$ represents an updated estimated value of the spatial coordinates of the UWB tag in a previous Newton iteration.

After the k−1$^{th}$ Newton iteration is completed, $\|\Delta p_{k-1}\|_2$ may be calculated, where $\|\Delta p_{k-1}\|_2$ represents a 2-norm of the vector $\Delta p_{k-1}$, as shown in formula (12):

$$\|\Delta p_{k-1}\|_2 = \sqrt{\Delta x_{k-1}^2 + \Delta y_{k-1}^2 + \Delta z_{k-1}^2} \quad \text{Formula (12)}$$

When $\|\Delta p_{k-1}\|_2 < v$ is satisfied, or a quantity of Newton iterations k≥w, the Newton iteration is stopped, and a positioning calculation result is output (to be specific, the estimated value that is of the spatial coordinates of the UWB tag in the UWB positioning system and that is finally obtained through calculation is output). v represents a convergence threshold of a distance of spatial movement in the current Newton iteration; and w represents an upper limit of the quantity of Newton iterations (or referred to as a maximum quantity of iterations). For example, v may be 0.05, and w may be 30. It should be noted that both v and w are preset values, and may be adjusted based on a requirement. Specific values of v and w are not limited in this application.

Figure 10:
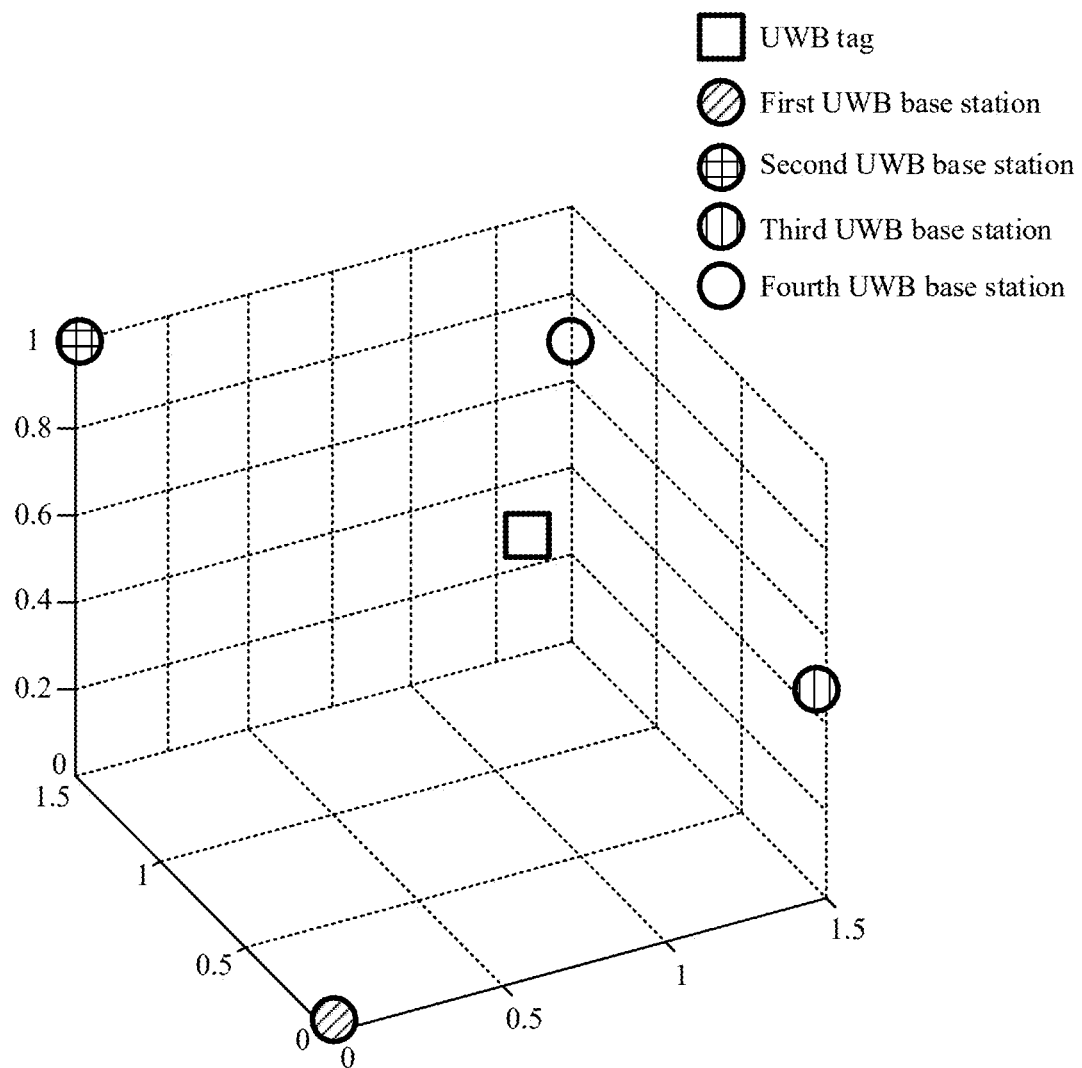
FIG. 10 is a schematic simulation diagram of a UWB positioning system according to an embodiment of this application.

The following uses an example of a simulation scenario of a UWB positioning system shown in FIG. 10 to describe a specific process in which a UWB tag obtains a first equation set including N equations based on first distances between all UWB base stations from the first UWB base station to the N$^{th}$ UWB base station and the UWB tag and spatial coordinates of all UWB base stations in a first coordinate system; and solves the first equation set in a first calculation manner, to obtain an estimated value of spatial coordinates of the UWB tag in the first coordinate system.

FIG. 10 is a schematic simulation diagram of the UWB positioning system according to an embodiment of this application. As shown in FIG. 10, it is assumed that the UWB positioning system includes a first UWB base station, a second UWB base station, a third UWB base station, a fourth UWB base station (that is, N is 4) and a UWB tag. Spatial coordinates of the first UWB base station in the first coordinate system are (0, 0, 0); spatial coordinates of the second UWB base station in the first coordinate system are (0, 1.5, 1); spatial coordinates of the third UWB base station in the first coordinate system are (1.5, 0, 0.5); and spatial coordinates of the fourth UWB base station in the first coordinate system are (1.5, 1.5, 0.7). When a measurement error is considered, a first distance $\rho^{(1)}$ that is between the UWB tag and the first UWB base station and that is obtained through measurement is 1.43; a first distance $\rho^{(2)}$ that is between the UWB tag and the second UWB base station and that is obtained through measurement is 1.30; a first distance $\rho^{(3)}$ that is between the UWB tag and the third UWB base station and that is obtained through measurement is 1.06; and a first distance $\rho^{(4)}$ that is between the UWB tag and the fourth UWB base station and that is obtained through measurement is 0.75. An initial iteration point is $p_0 = (1, 1, 1)$, a convergence threshold v is set to 0.05, and a maximum quantity of iterations w is 50.

According to a derivation process of the equation set (1) to the equation set (3), when k=1, in the foregoing formula (9):

$$G = \begin{bmatrix} 0.5773 & 0.5773 & 0.5773 \\ -0.408 & 0.816 & 0.408 \\ 0.894 & -0.447 & 0 \\ -0.651 & -0.651 & 0.391 \end{bmatrix}$$

$$b = \begin{bmatrix} -0.302 \\ -0.164 \\ 0.181 \\ -0.02 \end{bmatrix}$$

$$\Delta p_{k-1} = \Delta p_0$$

By substituting G, b, and $\Delta p_0$ into the foregoing formula (9), a linear matrix equation set when k=1 as shown in the following equation set (4) may be obtained:

$$\begin{bmatrix} 0.5773 & 0.5773 & 0.5773 \\ -0.408 & 0.816 & 0.408 \\ 0.894 & -0.447 & 0 \\ -0.651 & -0.651 & 0.391 \end{bmatrix} \cdot \Delta p_0 = \begin{bmatrix} -0.302 \\ -0.164 \\ 0.181 \\ -0.02 \end{bmatrix} \quad \text{Equation set (4)}$$

For the linear matrix equation set shown in the equation set (4), in the first iteration, the following $\Delta p_0$ may be obtained through calculation according to the least square method.

$$\Delta p_0 = (0.028, -0.164, -0.274)$$

According to further calculation, $p_1 = p_0 + \Delta p_0 = (1.028, 0.836, 0.7261)$ may be obtained.

Figure 11:
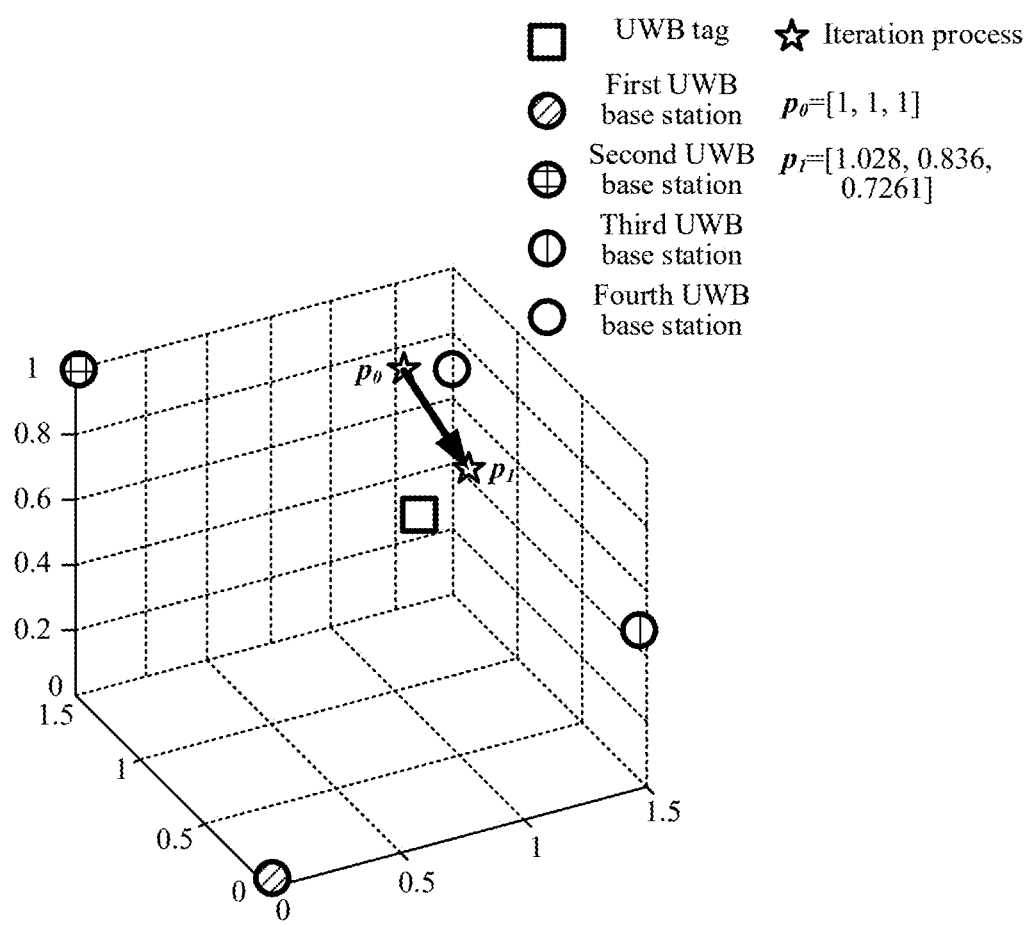
FIG. 11 is a schematic diagram of a Newton iteration process when k=1 according to an embodiment of this application.

It is obtained through calculation that $\|\Delta p_0\|^2 = 0.3204$, and is greater than v=0.05. Therefore, the estimated value of the spatial coordinates of the UWB tag may be updated from $p_0$ to $p_1$ in the first iteration. For example, for an iteration process when k=1, refer to FIG. 11.

The second iteration may continue to be performed after the first iteration, and the estimated value of the spatial coordinates of the UWB tag may be updated from $p_1$ to $p_2$. A process of the second iteration is similar to that of the first iteration, and details are not described again.

After the second iteration is completed, when the third iteration (that is, k=3) is performed, the following $\Delta p_2$ may be obtained through calculation:

$$\Delta p_2 = (0.003, 0.016, -0.045)$$

According to further calculation, $p_3 = p_2 + \Delta p_2 = (1.025, 0.949, 0.419)$ may be obtained.

Figure 12:
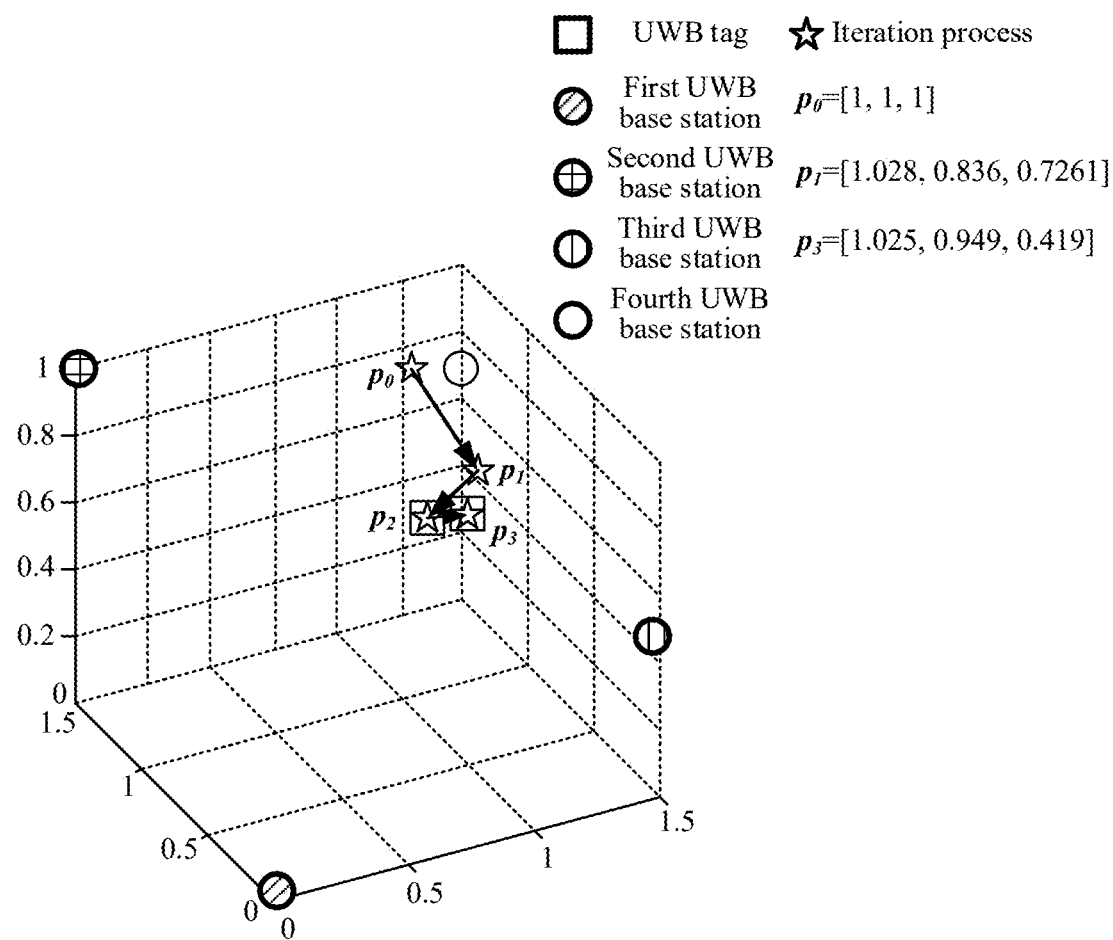
FIG. 12 is a schematic diagram of a Newton iteration process when k=3 according to an embodiment of this application.

It is obtained through calculation that $\|\Delta p_2\|_2 = 0.047$, and is less than v=0.05. Therefore, the iteration ends. In this case, it may be output that the estimated value that is of the spatial coordinates of the UWB tag in the first coordinate system and that is obtained through the current positioning calculation is (1.025, 0.949, 0.419). For example, for the iteration process when k=3, refer to FIG. 12.

After the UWB tag obtains the first equation set including the N equations based on the first distances between all UWB base stations from the first UWB base station to the N$^{th}$ UWB base station and the UWB tag and the spatial coordinates of all UWB base stations in the first coordinate system; and solves the first equation set in the first calculation manner, to obtain the estimated value of the spatial coordinates of the UWB tag in the first coordinate system according to the foregoing manner, the UWB tag may re-calculate a second distance between each UWB base station from the first UWB base station to the $N^{th}$ UWB base station and the UWB tag based on the estimated value of the spatial coordinates of the UWB tag in the first coordinate system and the spatial coordinates of each UWB base station in the first coordinate system. Then, the UWB tag may calculate a difference between the first distance and the second distance that are between each UWB base station and the UWB tag based on the second distance that is between each UWB base station and the UWB tag and that is obtained through re-calculation and the first distance that is between the UWB tag and each UWB base station from the first UWB base station to the $N^{th}$ UWB base station and that is obtained in S701. For example, S703 and S704 are performed.

S703: The UWB tag calculates the second distance between each UWB base station and the UWB tag based on the estimated value of the spatial coordinates of the UWB tag in the first coordinate system and the spatial coordinates of each UWB base station from the first UWB base station to the $N^{th}$ UWB base station in the first coordinate system.

It may be understood that, a process in which the UWB tag calculates the second distance between each UWB base station and the UWB tag based on the estimated value of the spatial coordinates of the UWB tag in the first coordinate system and the spatial coordinates of each UWB base station from the first UWB base station to the $N^{th}$ UWB base station in the first coordinate system has a principle similar to that of the foregoing nonlinear equation set (namely, the equation set (1)).

For example, the UWB tag may use the second distance between each UWB base station and the UWB tag as an unknown parameter, substitute the estimated value of the spatial coordinates of the UWB tag in the first coordinate system into the foregoing nonlinear equation set, and re-calculate the second distance between each UWB base station and the UWB tag.

Calculation of the second distance between the $i^{th}$ UWB base station and the UWB tag is used as an example. It is assumed that the estimated value of the spatial coordinates of the UWB tag in the first coordinate system obtained through calculation in S702 are $(\hat{x}, \hat{y}, \hat{z})$. In this case, the second distance $\hat{p}^{(i)}$ that is between the $i^{th}$ UWB base station and the UWB tag and that is obtained through re-calculation based on $(\hat{x}, \hat{y}, \hat{z})$ and the spatial coordinates of the $i^{th}$ UWB base station in the first coordinate system is as follows:

$$\hat{p}^{(i)} = \sqrt{(x^{(i)}-\hat{x})^2 + (y^{(i)}-\hat{y})^2 + (z(i)-\hat{z})^2}$$

$(x^{(i)}, y^{(i)}, z^{(i)})$ represents the spatial coordinates of the $i^{th}$ UWB base station in the first coordinate system.

Similarly, the second distance between each UWB base station and the UWB tag may be obtained through re-calculation, for example, may be sequentially represented as $\hat{p}^{(1)}, \hat{p}^{(2)}, \ldots,$ and $\hat{p}^{(n)}$.

S704: The UWB tag calculates an absolute value of a difference between the first distance and the second distance between each UWB base station from the first UWB base station to the $N^{th}$ UWB base station and the UWB tag.

In this embodiment of this application, the absolute value of the difference between the first distance and the second distance between each UWB base station and the UWB tag may also be referred to as a ranging residual, a residual, a ranging difference, or the like. This is not limited.

For example, calculation of the absolute value of the difference between the first distance and the second distance between the $i^{th}$ UWB base station and the UWB tag is used as an example. It is assumed that, as described above, the second distance that is between the $i^{th}$ UWB base station and the UWB tag and that is obtained through calculation in S703 is $\hat{p}^{(i)}$, and the first distance that is between the UWB base station and the UWB tag and that is obtained in S701 is $\hat{p}^{(i)}$. In this case, the absolute value of the difference between the first distance and the second distance between the $i^{th}$ UWB base station and the UWB tag may be calculated according to the following formula (13):

$$\Delta\rho^{(i)} = |\hat{p}^{(i)} - \rho^{(i)}| \qquad \text{Formula (13)}$$

$\Delta\rho^{(i)}$ represents the absolute value of the difference between the first distance and the second distance between the $i^{th}$ UWB base station and the UWB tag.

Similarly, the UWB tag may obtain the absolute value of the difference between the first distance and the second distance between each UWB base station from the first UWB base station to the $N^{th}$ UWB base station and the UWB tag.

S705: The UWB tag calculates a sum of absolute values of differences respectively corresponding to the first UWB base station to the $N^{th}$ UWB base station based on the absolute value of the difference between the first distance and the second distance between each UWB base station from the first UWB base station to the $N^{th}$ UWB base station and the UWB tag.

In this embodiment of this application, the sum of the absolute values of the differences respectively corresponding to the first UWB base station to the $N^{th}$ UWB base station may be referred to as a first value.

For example, the UWB tag may calculate the sum of the absolute values of the differences respectively corresponding to the first UWB base station to the $N^{th}$ UWB base station according to the following formula (14):

$$S = \Sigma_i \Delta\rho^{(i)} \qquad \text{Formula (14)}$$

S represents the sum of the absolute values of the differences respectively corresponding to the first UWB base station to the $N^{th}$ UWB base station, and the formula means $\Delta\rho^{(1)} + \Delta\rho^{(2)} + \ldots + \Delta\rho^{(n)}$. $\Delta\rho^{(1)}$ represents an absolute value of a difference between the first distance and the second distance between the first UWB base station and the UWB tag; $\Delta\rho^{(2)}$ represents an absolute value of a difference between the first distance and the second distance between the first UWB base station and the UWB tag; and by analogy, $\Delta\rho^{(n)}$ represents an absolute value of a difference between the first distance and the second distance between the $N^{th}$ UWB base station and the UWB tag.

S706: The UWB tag determines whether the sum of the absolute values of the differences respectively corresponding to the first UWB base station to the $N^{th}$ UWB base station is greater than a product of a sliding threshold and a threshold coefficient.

The sliding threshold is a variable that reflects a current positioning error. When the positioning error gradually increases, the sliding threshold also gradually increases. When the positioning error suddenly increases, it may be considered that a UWB base station is abnormal. In this embodiment of this application, the sliding threshold may be updated each time the UWB base station anomaly detection is performed. Updating of the sliding threshold is described in S709.

Therefore, the sliding threshold in S706 may be an initial value or a value updated when previous UWB base station anomaly detection is performed. Specifically, when the UWB base station anomaly detection is performed for the first time, the sliding threshold in S706 is the initial value. Then, when the UWB base station anomaly detection is performed each time, the sliding threshold in S706 is the value updated when previous UWB base station anomaly detection is performed.

For example, the initial value of the sliding threshold may be a value in a range from 0.5 to 1, for example, may be 0.5. The initial value of the sliding threshold is set to a value greater than 0. This can avoid false detection. In a plurality of detections, a value of the sliding threshold is gradually updated to a proper range.

The threshold coefficient is a coefficient of the sliding threshold. The threshold coefficient is a preset fixed value, and may be manually configured. For example, the threshold coefficient may be a value greater than 1 and less than 5, for example, may be 1.8. A larger threshold coefficient indicates a lower false alarm rate when the UWB base station anomaly detection method is used for detection. The false alarm rate indicates a probability that a UWB base station is not faulty but is detected as faulty in the UWB base station anomaly detection method.

When the sum of the absolute values of the differences respectively corresponding to the first UWB base station to the $N^{th}$ UWB base station is greater than the product of the threshold coefficient and the sliding threshold, S707 is first performed, and then S710 is performed. When the sum of the absolute values of the differences respectively corresponding to the first UWB base station to the $N^{th}$ UWB base station is less than the product of the threshold coefficient and the sliding threshold, S708 and S709 are first performed, and then S710 is performed.

Optionally, when the sum of the absolute values of the differences respectively corresponding to the first UWB base station to the $N^{th}$ UWB base station is equal to the product of the threshold coefficient and the sliding threshold, S707 may be first performed, and then S710 is performed; or S708 and S709 may be first performed, and then S710 is performed. This is not limited herein. FIG. 7A-1 and FIG. 7A-2 use an example in which, when the sum of the absolute values of the differences respectively corresponding to the first UWB base station to the $N^{th}$ UWB base station is equal to the product of the threshold coefficient and the sliding threshold, S708 and S709 are first performed, and then S710 is performed.

S707: The UWB tag increases an anomaly detection times variable by 1.

S708: The UWB tag decreases the anomaly detection times variable by 1.

It may be understood that the steps described in S707 and S708 are actually steps of updating the anomaly detection times variable. The anomaly detection times variable in S707 or S708 is an initial value or a value obtained in last updating. For example, the initial value of the anomaly detection times variable may be 0.

When the sum of the absolute values of the differences respectively corresponding to all the UWB base stations is greater than the product of the threshold coefficient and the sliding threshold, the anomaly detection times variable is increased by 1. This can intuitively indicate whether a data amount exceeds the product of the sliding threshold and the threshold coefficient for a plurality of consecutive times in short time in the UWB base station anomaly detection process. If yes, it may be considered that a UWB base station is abnormal. However, when the sum of the absolute values of the differences respectively corresponding to all the UWB base stations is less than the product of the threshold coefficient and the sliding threshold, the anomaly detection times variable is decreased by 1. In this way, a case in which a sum of absolute values of differences corresponding to all UWB base stations is greater than the product of the threshold coefficient and the sliding threshold in only one or two detection processes is filtered out, and it is considered that there is no abnormal UWB base station, so that occurrence of false detection is reduced.

In this embodiment of this application, when updated, the anomaly detection times variable may be increased or decreased by another value not limited to 1, for example, 2 or 3. Therefore, in this embodiment of this application, in S707, the UWB tag may increase the anomaly detection times variable by an amplitude of a first preset interval once, and in S708, the UWB tag may decrease the anomaly detection times variable by an amplitude of a second preset interval once. The first preset interval and the second preset interval may be the same or different. The first preset interval and the second preset interval are not limited in this application.

S709: The UWB tag updates the sliding threshold based on the sum of the absolute values of the differences respectively corresponding to the first UWB base station to the $N^{th}$ UWB base station.

For example, the UWB tag may update the sliding threshold according to the following formula (15):

$$T_w = a \cdot T_{w-1} + (1-a) \cdot S \qquad \text{Formula (15)}$$

$T_w$ represents an updated sliding threshold; $T_{w-1}$ represents the sliding threshold obtained in the previous updating; S represents the sum of the absolute values of the differences respectively corresponding to the first UWB base station to the $N^{th}$ UWB base station; and a represents a preset filter coefficient (or filtering coefficient), which may be 0.8, 0.9, 0.99, or the like, which is not limited herein.

S710: The UWB tag determines whether the anomaly detection times variable is greater than an anomaly detection times threshold.

When the anomaly detection times variable is greater than the anomaly detection times threshold, perform S711. When the anomaly detection times variable is less than the anomaly detection times threshold, go back to S701.

Optionally, when the anomaly detection times variable is equal to the anomaly detection times threshold, S711 may be performed, or S701 may be returned to be performed. This is not limited herein. FIG. 7A-1 and FIG. 7A-2 use an example in which, when the anomaly detection times variable is equal to the anomaly detection times threshold, S701 is returned to be performed.

The anomaly detection times threshold in S710 may be a preset value that is manually configured. For example, the anomaly detection times threshold may be 5, 6, or the like, which is not limited herein.

S711: The UWB tag determines that a UWB base station in a UWB positioning system is abnormal.

After it is determined that a UWB base station is abnormal in S711, which UWB base station is abnormal or which UWB base stations are abnormal may be further determined by mutual measurement of distances between the UWB base stations.

Optionally, the UWB tag is integrated into an electronic device. The electronic device may inform, through voice output and/or visual output, of which UWB base station is abnormal or which UWB base stations are abnormal.

Optionally, the abnormal UWB base station may raise an alarm through voice output (for example, a horn) and/or visual output (for example, flashing alarm lights and the like, or displaying a notification message or the like on a mobile device) by using a device (for example, an associated mobile device) integrated to the UWB base station or associated with the UWB base station, or may raise an alarm in another manner. This is not limited in this application.

The steps described in S704 to S711 are specific implementation processes of Part 4 in the UWB base station anomaly detection method provided in this embodiment of this application. The following describes the process described in S704 to S711 by using an example.

For example, the anomaly detection times threshold is 5. It is assumed that in one anomaly detection performed by the UWB base station, the anomaly detection times variable is K, the threshold coefficient is L, the sliding threshold is T, and the sum that is of the absolute values of the differences respectively corresponding to the first UWB base station to the $N^{th}$ UWB base station and that is obtained through calculation in S704 and S705 is S. In this case, the process described in S706 to S711 is as follows: When S is greater than or equal to a product of L and T (that is, S≥L·T), the value of K is increased by 1; otherwise, when S<L·T, the value of K is decreased by 1. When the value of K is greater than 5, it is determined that a UWB base station in the UWB positioning system is abnormal. In addition, in the anomaly detection process, when S is less than the product of L and T (that is, S<L·T), T is further updated according to the descriptions in S709.

Generally, after a UWB base station is abnormally displaced or is blocked by an obstruction, the UWB base station cannot recover in short time, and a difference between a first distance and a second distance between the UWB tag and the abnormal UWB base station in the first UWB base station to the $N^{th}$ UWB base station increases significantly. Therefore, when a UWB base station is abnormally displaced or is blocked by an obstruction, by using the UWB base station anomaly detection method provided in this embodiment of this application, it can be detected in time, based on the difference between the first distance and the second distance between the UWB tag and each UWB base station from the first UWB base station to the $N^{th}$ UWB base station, that the UWB base station in the UWB positioning system is abnormal. In addition, it may be understood that, when hardware of a UWB base station is faulty, the difference between the first distance and the second distance between the UWB tag and the abnormal UWB base station in the first UWB base station to the $N^{th}$ UWB base station is also abnormal. Therefore, when hardware of a UWB base station is faulty (for example, an internal circuit is abnormal), according to the UWB base station anomaly detection method provided in this embodiment of this application, the UWB base station anomaly in the UWB positioning system can also be detected.

According to the foregoing descriptions, by using the UWB base station anomaly detection method provided in this embodiment of this application, the anomaly of the UWB base station caused by cases including but not limited to displacement and blocking of the UWB base station can be timely learned of. For example, by using the UWB base station anomaly detection method, a working status anomaly caused by a hardware fault or anomaly of the UWB base station can be detected, and a working status anomaly caused by displacement of the UWB base station due to a man-made or non-man-made reason, or a weak received signal due to blocking of an obstruction, or the like can be detected.

In addition, in the UWB base station anomaly detection method provided in this embodiment of this application, an update mechanism of the abnormality detection times variable and the sliding threshold and a rule for determining a UWB base station anomaly with reference to the abnormality detection times variable and the sliding threshold can reduce influence of some outliers in the differences between first distances and second distances between the UWB tag and all UWB base stations from the first UWB base station to the $N^{th}$ UWB base station on a result of the UWB base station anomaly detection, and improve detection accuracy.

Figure 13A:
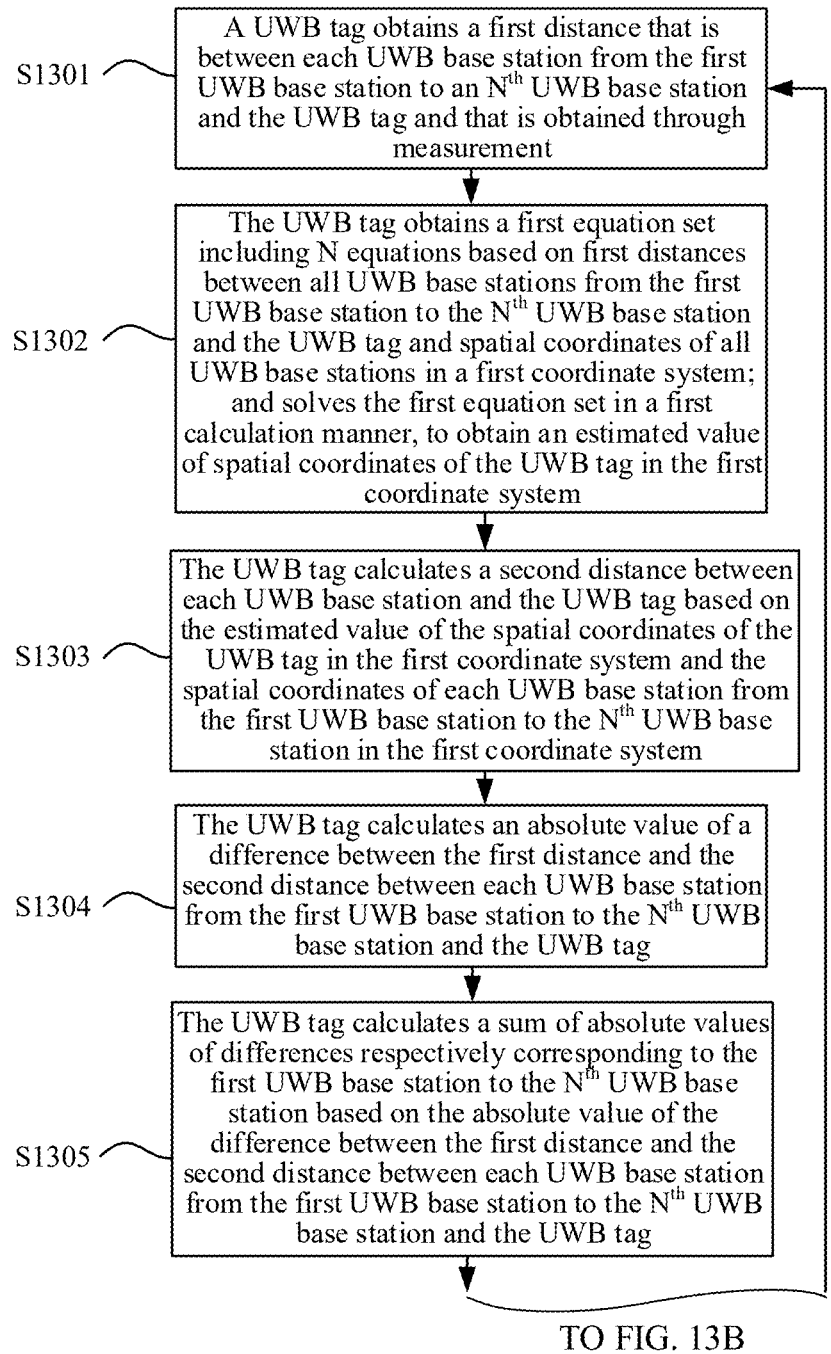
FIG. 13A and FIG. 13B are another schematic flowchart of a UWB base station anomaly detection method according to an embodiment of this application.
Figure 13B:
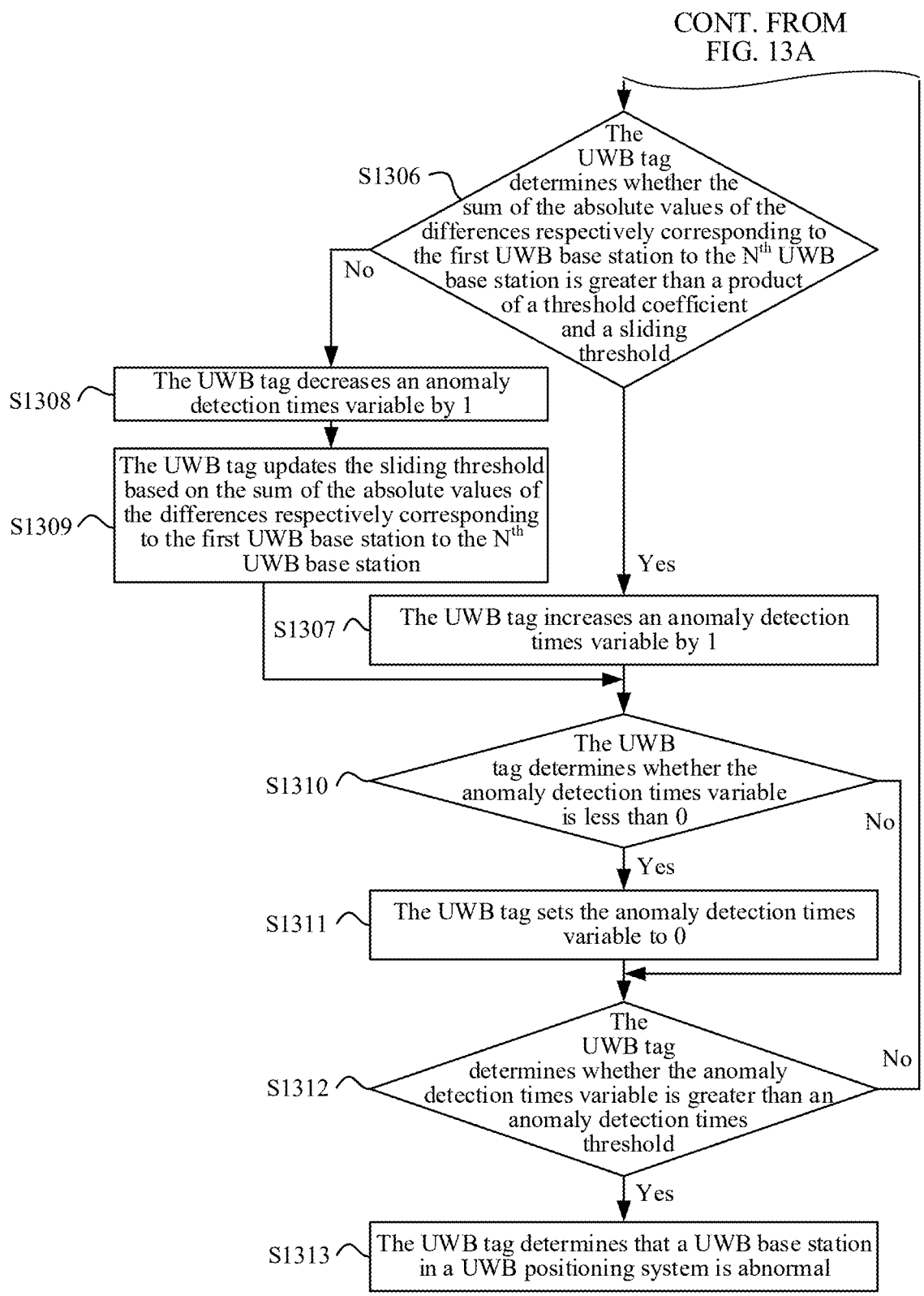

Optionally, in this embodiment of this application, each time the UWB base station anomaly detection is performed, if the updated value of the anomaly detection times variable is less than 0, the anomaly detection times variable needs to be set to 0. For example, FIG. 13A and FIG. 13B are another schematic flowchart of a UWB base station anomaly detection method according to an embodiment of this application. As shown in FIG. 13A and FIG. 13B, the UWB base station anomaly detection method includes the following steps.

S1301 to S1309: S1301 to S1309 are respectively the same as S701 to S709, and details are not described herein again.

S1310: The UWB tag determines whether the anomaly detection times variable is less than 0.

When the anomaly detection times variable is less than 0, S1311 is first performed, and then S1312 is performed. When the anomaly detection times variable is not less than 0, S1312 is directly performed.

S1311: The UWB tag sets the anomaly detection times variable to 0.

S1312 and S1313: S1312 and S1313 are respectively the same as S710 to S711, and details are not described herein again.

Optionally, in the UWB base station anomaly detection method provided in this embodiment of this application, when obtaining, in S702 (or S1302), the first equation set including N equations based on the first distance between the UWB tag and all UWB base stations from the first UWB base station to the $N^{th}$ UWB base station and the spatial coordinates of all UWB base stations in the first coordinate system; and solving the first equation set in the first calculation manner, if a solution result is divergent (where for example, if a converged value cannot be obtained after the Newton iteration exceeds 30 times, it indicates that the solution result is divergent), it may be directly considered that a determining result of S706 (or S1306) is that the sum of the differences respectively corresponding to the first UWB base station to the $N^{th}$ UWB base station is greater than the product of the threshold coefficient and the sliding threshold, and S707 (or S1307) and subsequent steps are directly performed.

Optionally, in this embodiment of this application, when the UWB tag determines that a UWB base station in the UWB positioning system is abnormal, the UWB tag may further determine, in a manner of mutual measurement of distances between the base stations, a specific UWB base station that is abnormal from a plurality of UWB base stations (for example, the first UWB base station to the $N^{th}$ UWB base station) in the UWB positioning system, and notify the user.

For example, when the UWB tag determines that a UWB base station in the UWB positioning system is abnormal, the UWB tag may send an indication to a first target UWB base station in the UWB positioning system, to indicate the first target UWB base station to measure distances between the first target UWB base station and other UWB base stations. The first target UWB base station may be any UWB base station in the first UWB base station to the $N^{th}$ UWB base station. In a period of time, the first target UWB base station may continuously measure distances (which may be referred to as third distances) between the first target UWB base station and the other UWB base stations for a plurality of times (for example, 10 times), calculate distance errors between the first target UWB base station and the other UWB base stations, and then return the distance errors to the UWB tag.

When only one second target UWB base station in the other UWB base stations meets a condition that a quantity of times that a distance error between the first target UWB base station and the second target UWB base station exceeds an error threshold in the plurality of measurements is greater than or equal to a preset quantity of times (for example, 7 times), the UWB tag may determine that the second target UWB base station is abnormal.

When the other UWB base stations meet a condition that a quantity of times that a distance error between the first target UWB base station and each of the other UWB base stations exceeds the error threshold in the plurality of measurements is greater than or equal to a preset quantity of times (for example, 7 times), the UWB tag may determine that the first target UWB base station is abnormal, or that all of the other UWB base stations are abnormal. In this case, the UWB tag may further select a third target UWB base station and a fourth target UWB base station from the other UWB base stations, and indicate the third target UWB base station to measure a distance between the third target UWB base station and the fourth target UWB base station. The third target UWB base station and the fourth target UWB base station may be any two UWB base stations selected from the UWB base stations other than the first target UWB base station. In a period of time, the third target UWB base station may continuously measure a distance (which may be referred to as a fourth distance) between the third target UWB base station and the fourth target UWB base station for a plurality of times (for example, 10 times), calculate a distance error between the third target UWB base station and the fourth target UWB base station, and then return the distance error to the UWB tag. When a quantity of times that the distance error between the third target UWB base station and the fourth target UWB base station exceeds the error threshold in the plurality of measurements is greater than or equal to a preset quantity of times (for example, 7 times), the UWB tag may determine that all the UWB base stations other than the first target UWB base station in the UWB positioning system are abnormal. When a quantity of times that the distance error between the third target UWB base station and the fourth target UWB base station exceeds the error threshold in the plurality of measurements is less than a preset quantity of times (for example, 7 times), the UWB tag may determine that the first target UWB base station in the UWB positioning system is abnormal.

In some other implementations, when the other UWB base stations meet a condition that a quantity of times that the distance error between the first target UWB base station and each of the other UWB base stations exceeds the error threshold in the plurality of measurements is greater than or equal to a preset quantity of times, after the UWB tag further selects the third target UWB base station and the fourth target UWB base station from the other UWB base stations, the UWB tag may indicate the fourth target UWB base station to measure the distance between the fourth target UWB base station and the third target UWB base station. A principle is the same as that of the foregoing manner. Details are not described again.

In addition, it should be noted that, in this embodiment of this application, both the preset quantity of times and the error threshold may be manually configured values. For example, the error threshold may be 0.1 m, 0.2 m, or the like. Values of the preset quantity of times and the error threshold are not limited in this application.

The following uses the UWB positioning system (where the UWB positioning system includes the UWB tag 100, the UWB base station 200, the UWB base station 300, and the UWB base station 400) shown in FIG. 1 as an example, to describe a process of determining a specific UWB base station that is abnormal through mutual measurement of the distances between the base stations.

First, the UWB tag 100 may select a first target UWB base station from the UWB base station 200, the UWB base station 300, and the UWB base station 400 as a reference, for example, select the UWB base station 200 as the reference. Then, the UWB tag 100 may indicate the UWB base station 200 to measure a distance between the UWB base station 200 and the UWB base station 300, and a distance between the UWB base station 200 and the UWB base station 400. For example, the UWB tag 100 may send an indication message to the UWB base station 200. The UWB base station 200 may separately measure the distance between the UWB base station 200 and the UWB base station 300 and the distance between the UWB base station 200 and the UWB base station 400 for 10 consecutive times, and calculate a distance error between the UWB base station 200 and the UWB base station 300 and a distance error between the UWB base station 200 and the UWB base station 400 in each measurement.

For example, calculation of the distance error between the UWB base station 200 and the UWB base station 300 is used as an example. It is assumed that the distance that is between the UWB base station 200 and the UWB base station 300 and that is measured by the UWB base station 200 is $d_1$. In this case, the UWB base station 200 may calculate the distance error between the UWB base station 200 and the UWB base station 300 according to the following formula (16):

$$r_{12}=|d_1-d_2| \qquad \text{Formula (16)}$$

$r_{12}$ represents the distance error between the UWB base station 200 and the UWB base station 300, and $d_2$ represents a known distance between the UWB base station 200 and the UWB base station 300.

Specifically, $d_2$ may be obtained through calculation according to the following formula (17):

$$d_{12}=\sqrt{(x^{(1)}-x^{(2)})^2+(y^{(1)}-y^{(2)})^2+(z^{(1)}-z^{(2)})^2} \qquad \text{Formula (17)}$$

$(x^{(1)}, y^{(1)}, z^{(1)})$ represents spatial coordinates of the UWB base station 200 in the first coordinate system, and $(x^{(2)}, y^{(2)}, z^{(2)})$ represents spatial coordinates of the UWB base station 300 in the first coordinate system. It may be understood that, as described in the foregoing embodiment, both the spatial coordinates of the UWB base station 200 in the first coordinate system and the spatial coordinates of the UWB base station 300 in the first coordinate system are known parameters.

Similarly, the UWB base station 200 may obtain the distance error between the UWB base station 200 and the UWB base station 400 through calculation, and details are not described again.

After obtaining, through calculation, distance errors between the UWB base station 200 and the UWB base station 300 and distance errors between the UWB base station 200 and the UWB base station 400 that are respectively corresponding to the 10 measurements, the UWB base station 200 may return the distance errors to the UWB tag 100.

When only one second target UWB base station in the UWB base station 300 and the UWB base station 400 meets a condition that a quantity of times that a distance error between the UWB base station 200 and the second target UWB base station exceeds the error threshold in the 10 measurements is greater than or equal to 7 times, the UWB tag 100 may determine that the second target UWB base station is abnormal. For example, only the UWB base station 300 meets a condition that a quantity of times that the distance error between the UWB base station 200 and the UWB base station 300 exceeds the error threshold in the 10 measurements is greater than or equal to 7 times, the UWB tag 100 may determine that the UWB base station 300 is abnormal.

When the UWB base station 300 and the UWB base station 400 meet a condition that a quantity of times that the distance error between the UWB base station 200 and the UWB base station 300 exceeds the error threshold in the 10 measurements is greater than or equal to 7 times, and a quantity of times that the distance error between the UWB base station 200 and the UWB base station 400 exceeds the error threshold in the 10 measurements is also greater than or equal to 7 times, the UWB tag 100 may determine that the UWB base station 200 is abnormal, or that the UWB base station 300 and the UWB base station 400 are both abnormal. In this case, the UWB tag 100 may further indicate the UWB base station 300 to measure a distance between the UWB base station 300 and the UWB base station 400. The UWB base station 300 may continuously measure the distance between the UWB base station 300 and the UWB base station 400 for 10 times, calculate a distance error between the UWB base station 300 and the UWB base station 400, and then return the distance error to the UWB tag 100. When a quantity of times that the distance error between the UWB base station 300 and the UWB base station 400 exceeds the error threshold in 10 measurements is greater than or equal to 7 times, the UWB tag 100 may determine that the UWB base station 300 and the UWB base station 400 are both abnormal. When a quantity of times that the distance error between the UWB base station 300 and the UWB base station 400 exceeds the error threshold in 10 measurements is less than 7 times, the UWB tag 100 may determine that the UWB base station 200 is abnormal.

A manner of calculating the distance error between the UWB base station 300 and the UWB base station 400 is the same as the foregoing manner of calculating the distance error between the UWB base station 200 and the UWB base station 300, and details are not described again.

It should be further noted that, in the descriptions of determining the specific abnormal UWB base station in the foregoing embodiment of this application, although only two cases in which only one UWB base station is abnormal and only one UWB base station is normal (where all the other UWB base stations are abnormal) are described, it should be understood that when two UWB base stations, three UWB base stations, or even more UWB base stations are abnormal in the UWB positioning system, specific abnormal UWB base stations may also be determined with reference to the manner the same as that in the foregoing embodiment, and details are not described again.

Optionally, in this embodiment of this application, after determining the abnormal UWB base station in the UWB positioning system, the UWB tag may send prompt information to a user. For example, when the UWB tag is integrated or deployed on a mobile phone, prompt information such as a text prompt or a sound prompt may be sent to the user through the mobile phone, to notify that the UWB base station in the UWB system is abnormal. The prompt information may further specifically indicate information such as a number and a location of the abnormal UWB base station. This is not limited in this application.

Optionally, after checking and adjusting a spatial status of the abnormal UWB base station, the user may actively deliver a re-initialization command to the UWB base station to perform initialization, or the UWB base station may automatically re-initialize after specific duration.

Optionally, in this embodiment of this application, when it is detected that a UWB base station in the UWB positioning system is abnormal, when there is no user intervention and re-initialization of the abnormal UWB base station cannot be completed, to ensure that a positioning result output by the UWB tag is available, ranging data (to be specific, the measured distance between the abnormal UWB base station and the UWB tag) of the abnormal UWB base station may be removed during positioning calculation (to be specific, calculating a location of the UWB tag).

It should be further noted that, in the foregoing embodiment, the UWB base station anomaly detection method provided in this embodiment of this application is described by using an example in which the UWB tag is the execution body. However, in some other implementations, the UWB base station anomaly detection method provided in this embodiment of this application may alternatively be performed by another device.

For example, in some implementations, the UWB base station anomaly detection method provided in this embodiment of this application may be performed by any UWB base station in the UWB positioning system. In the UWB positioning system, each UWB base station and the UWB tag may synchronize data such as a first distance that is between the UWB tag and each UWB base station from the first UWB base station to the $N^{th}$ UWB base station and that is obtained through measurement, and spatial coordinates of each UWB base station in the first coordinate system, so that each UWB base station may also perform, based on the data, the UWB base station anomaly detection method provided in this embodiment of this application. The principle is the same as that in the UWB tag, and details are not described again.

For another example, in some other implementations, when the UWB tag is deployed on a first electronic device (where for the first electronic device, refer to the descriptions in the foregoing embodiment), the UWB base station anomaly detection method provided in this embodiment of this application may also be executed by the first electronic device. The first electronic device may include a hardware structure, like a processor or a chip, other than the UWB tag. The first electronic device may invoke, from the UWB data, data such as a first distance that is between the UWB tag and each UWB base station from the first UWB base station to the $N^{th}$ UWB base station and that is obtained through measurement, and spatial coordinates of each UWB base station in the first coordinate system, and perform, by using the hardware structure like the processor or the chip, the UWB base station anomaly detection method provided in this embodiment of this application.

For another example, in some other implementations, the UWB positioning system may further include a second electronic device specially configured to perform positioning calculation on a location of a UWB tag. For example, the second electronic device may be a server, a computer, a router, a gateway connected to the UWB tag, or the like. The second electronic device may also be referred to as a positioning engine of the UWB positioning system. For this kind of UWB positioning system, the UWB base station anomaly detection method provided in this embodiment of this application may alternatively be performed by the second electronic device.

Figure 14:
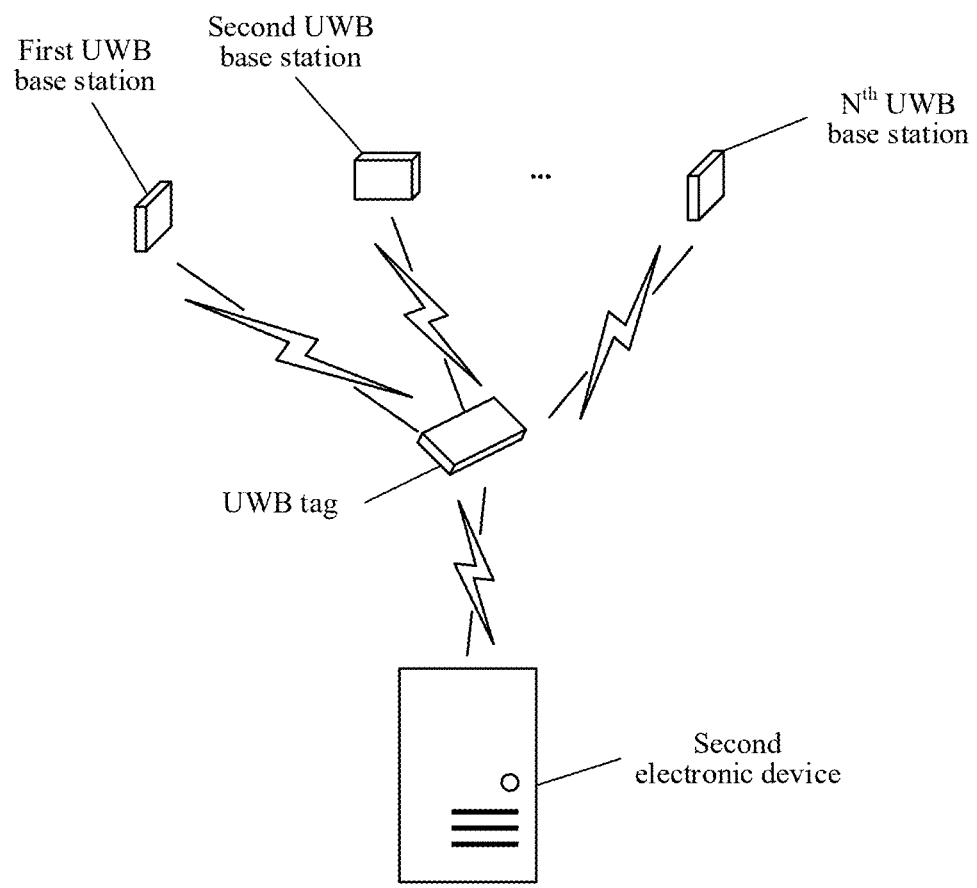
FIG. 14 is another schematic composition diagram of a UWB positioning system according to an embodiment of this application.

For example, FIG. 14 is another schematic composition diagram of a UWB positioning system according to an embodiment of this application. As shown in FIG. 14, the UWB positioning system may include: a second electronic device, a UWB tag, a first UWB base station, a second UWB base station, . . . , and an $N^{th}$ UWB base station (where N is a positive integer greater than 2). The second electronic device may be connected to the UWB tag by using a network. It may be understood that FIG. 14 shows only one UWB tag, but the UWB positioning system may actually further include more UWB tags. This is not limited herein.

For the UWB positioning system shown in FIG. 14, the steps of the UWB base station anomaly detection method provided in this embodiment of this application may be performed in the UWB tag (refer to the descriptions in the foregoing embodiment), or may be performed in any one of the first UWB base station to the $N^{th}$ UWB base station, or may be performed in the second electronic device.

It may be understood that when the steps of the UWB base station anomaly detection method are performed in the second electronic device, the second electronic device needs to first obtain related data required for performing the UWB base station anomaly detection method, for example, a first distance between the UWB tag and each UWB base station from the first UWB base station to the $N^{th}$ UWB base station and spatial coordinates of each UWB base station in a first coordinate system.

Figure 15:
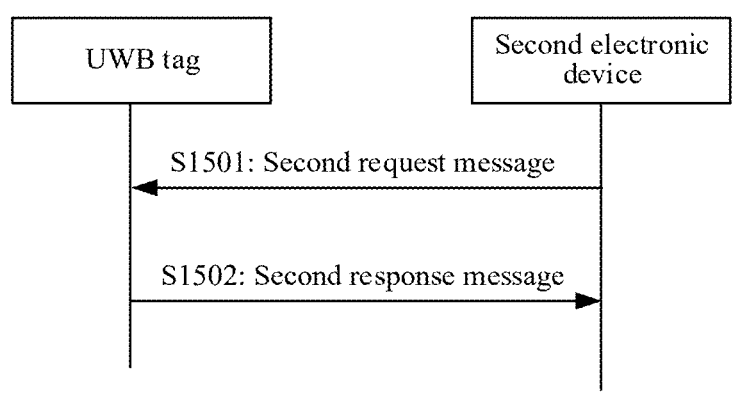
FIG. 15 is a schematic flowchart of interaction between a UWB tag and a second electronic device according to an embodiment of this application.

For example, FIG. 15 is a schematic flowchart of interaction between the UWB tag and the second electronic device according to an embodiment of this application. The second electronic device may obtain, from the UWB tag by using the interaction procedure shown in FIG. 15, the related data required for performing the UWB base station anomaly detection method. As shown in FIG. 15, the procedure of interaction between the UWB tag and the second electronic device includes the following steps.

S1501: The second electronic device sends a second request message to the UWB tag.

The second request message may request, from the UWB tag, to obtain the first distance between each UWB base station from the first UWB base station to the $N^{th}$ UWB base station and the UWB tag and the spatial coordinates of each UWB base station in the first coordinate system.

Correspondingly, the UWB tag receives the second request message.

S1502: The UWB tag sends a second response message to the second electronic device.

The second response message may include data such as the first distance between the UWB tag and each UWB base station from the first UWB base station to the $N^{th}$ UWB base station and the spatial coordinates of each UWB base station in the first coordinate system. For a process in which the UWB tag obtains through measurement the data, such as the first distance between each UWB base station from the first UWB base station to the $N^{th}$ UWB base station and the UWB tag and the spatial coordinates of each UWB base station in the first coordinate system, refer to the foregoing embodiment. This is not described herein again.

Optionally, in some embodiments, the second electronic device may not need to send the second request message to the UWB tag, and after obtaining the first distance between each UWB base station from the first UWB base station to the $N^{th}$ UWB base station and the UWB tag through measurement each time, the UWB tag may actively send the data, obtained through measurement, such as the first distance between each UWB base station from the first UWB base station to the $N^{th}$ UWB base station and the UWB tag, and the spatial coordinates of each UWB base station in the first coordinate system to the second electronic device. This is not limited herein.

After obtaining the data, obtained through measurement, such as the first distance between each UWB base station from the first UWB base station to the $N^{th}$ UWB base station and the UWB tag, and the spatial coordinates of each UWB base station in the first coordinate system to the second electronic device, the second electronic device may perform, according to a manner similar to that described in the foregoing embodiment, the UWB base station anomaly detection method provided in this embodiment of this application.

Figure 16A:
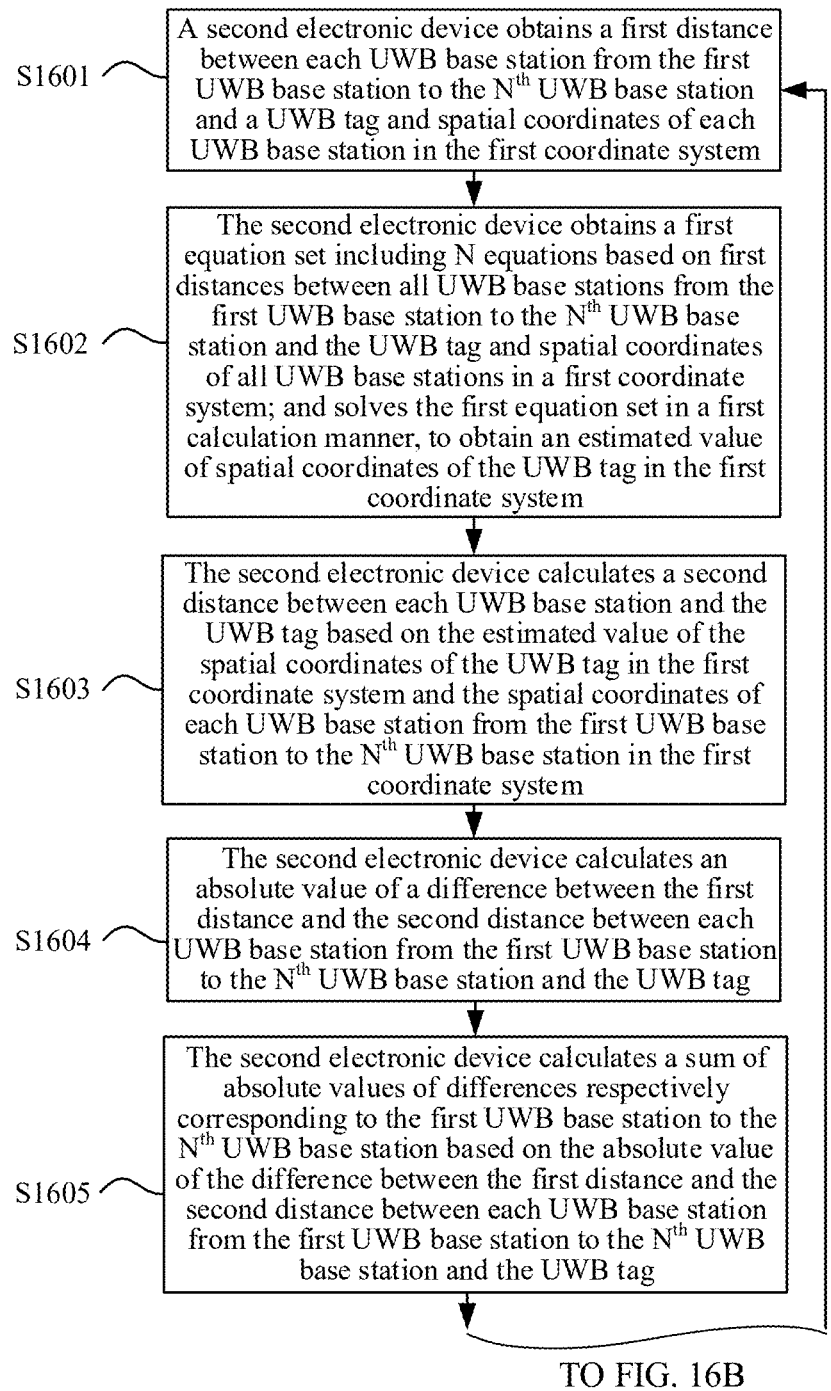
FIG. 16A and FIG. 16B are still another schematic flowchart of a UWB base station anomaly detection method according to an embodiment of this application.
Figure 16B:
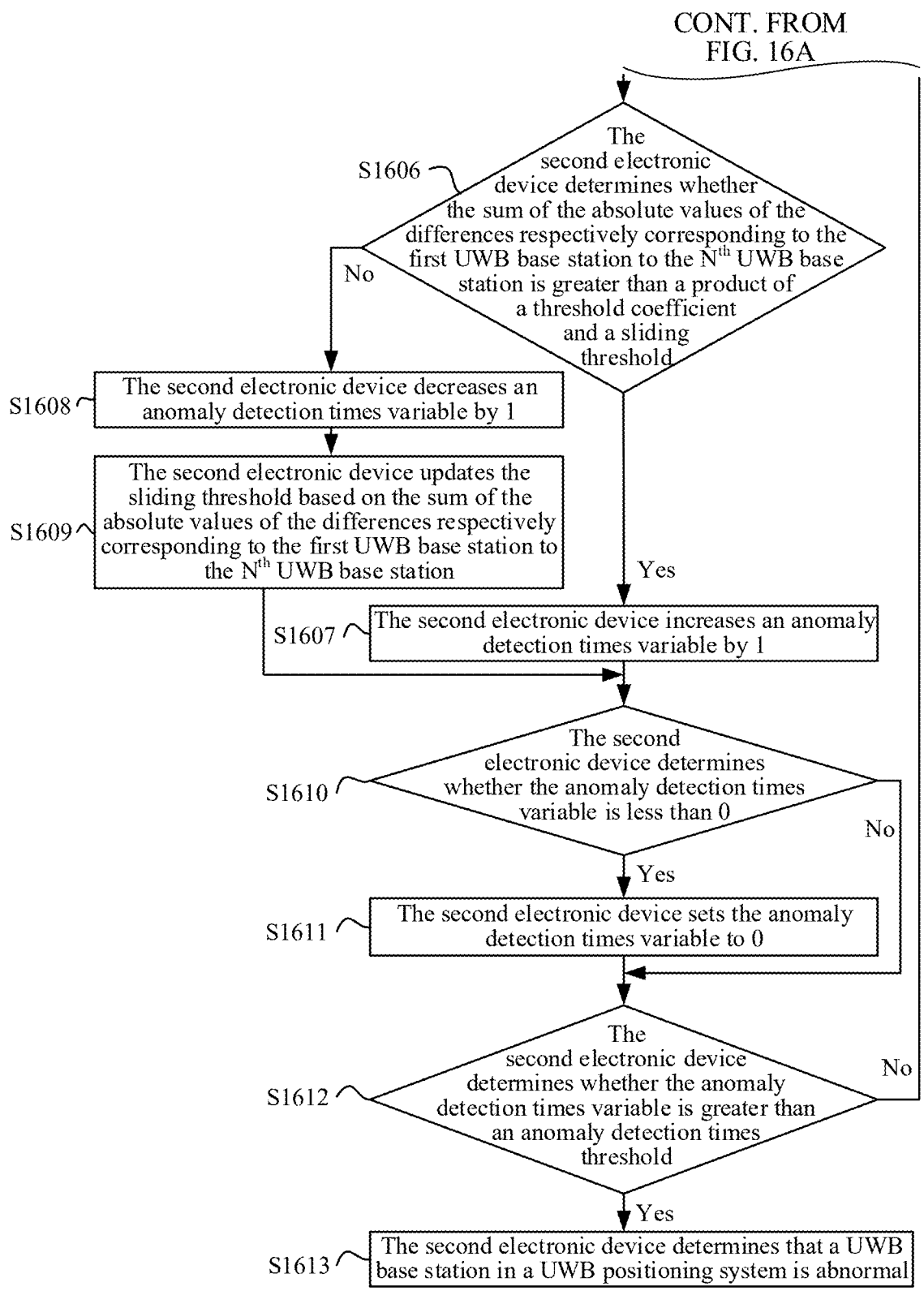

For example, FIG. 16A and FIG. 16B are still another schematic flowchart of a UWB base station anomaly detection method according to an embodiment of this application. As shown in FIG. 16A and FIG. 16B, steps in which a second electronic device performs the UWB base station anomaly detection method provided in this embodiment of this application may include the following steps.

S1601 to S1613: S1601 to S1613 are respectively the same as S1301 to S1313, and a difference lies only in that an execution body is the second electronic device rather than a UWB tag. For details, refer to the foregoing descriptions of S1301 to S1313.

It should be noted that, for the UWB positioning system shown in FIG. 14, the UWB tag may obtain, through measurement, a first distance that is between each UWB base station from the first UWB base station to the $N^{th}$ UWB base station and the UWB tag. Then, the UWB tag may send the first distance between the UWB tag and each UWB base station from the first UWB base station to the $N^{th}$ UWB base station and spatial coordinates of each UWB base station in a first coordinate system to the second electronic device. Therefore, the second electronic device may perform the method procedure shown in FIG. 16A and FIG. 16B.

The first coordinate system is a navigation coordinate system of the UWB positioning system, and the spatial coordinates of each UWB base station in the first coordinate system is a known parameter. For details, refer to the descriptions in the foregoing embodiment, and details are not described herein again.

Optionally, when the second electronic device determines that a UWB base station in the UWB positioning system is abnormal, the second electronic device may further determine, in a manner of mutual measurement of distances between the base stations, a specific UWB base station that is abnormal in the first UWB base station to the $N^{th}$ UWB base station.

For example, the second electronic device may send, through the UWB tag, an indication to a first target UWB base station in the UWB positioning system, to indicate the first target UWB base station to measure distances between the first target UWB base station and other UWB base stations. The first target UWB base station may be any UWB base station in the first UWB base station to the $N^{th}$ UWB base station. In a period of time, the first target UWB base station may continuously measure distances between the first target UWB base station and the other UWB base stations for a plurality of times (for example, 10 times), calculate distance errors between the first target UWB base station and the other UWB base stations, and then return the distance errors to the second electronic device through the UWB tag.

When only one second target UWB base station in the other UWB base stations meets a condition that a quantity of times that a distance error between the first target UWB base station and the second target UWB base station exceeds an error threshold in the plurality of measurements is greater than or equal to a preset quantity of times (for example, 7 times), the second electronic device may determine that the second target UWB base station is abnormal.

When the other UWB base stations meet a condition that a quantity of times that a distance error between the first target UWB base station and each of the other UWB base stations exceeds the error threshold in the plurality of measurements is greater than or equal to a preset quantity of times (for example, 7 times), the second electronic device may determine that the first target UWB base station is abnormal, or that all of the other UWB base stations are abnormal. In this case, the second electronic device may further select a third target UWB base station and a fourth target UWB base station from the other UWB base stations, and indicate the third target UWB base station to measure a distance between the third target UWB base station and the fourth target UWB base station (for example, may send an indication to the third target UWB base station through the UWB tag). The third target UWB base station and the fourth target UWB base station may be any two UWB base stations selected from the UWB base stations other than the first target UWB base station. In a period of time, the third target UWB base station may continuously measure a distance between the third target UWB base station and the fourth target UWB base station for a plurality of times (for example, 10 times), calculate a distance error between the third target UWB base station and the fourth target UWB base station, and then return the distance error to the second electronic device through the UWB tag. When a quantity of times that the distance error between the third target UWB base station and the fourth target UWB base station exceeds the error threshold in the plurality of measurements is greater than or equal to a preset quantity of times (for example, 7 times), the second electronic device may determine that all the UWB base stations other than the first target UWB base station in the UWB positioning system are abnormal. When a quantity of times that the distance error between the third target UWB base station and the fourth target UWB base station exceeds the error threshold in the plurality of measurements is less than a preset quantity of times (for example, 7 times), the second electronic device may determine that the first target UWB base station in the UWB positioning system is abnormal.

In other words, a difference from the foregoing embodiment in which the UWB tag is the execution body lies in that when the second electronic device is used as the execution body, the second electronic device needs to send an indication to the UWB base station through the UWB tag, start mutual measurement of the distances between the base stations, and obtain the result of mutual measurement of the distances between the base stations through the UWB tag. Therefore, the second electronic device can further determine, based on the result of mutual measurement of the distances between the base stations, the specific UWB base station that is abnormal.

The foregoing embodiment provides an example of a process in which the UWB tag, the UWB base station, the first electronic device, or the second electronic device is used as the execution body to implement the UWB base station anomaly detection method. Optionally, alternatively, in some other embodiments, in the UWB base station anomaly detection method provided in this embodiment of this application, some steps may be completed in the UWB tag, and other steps may be completed in the UWB base station. Alternatively, some steps are completed in the UWB tag, and other steps are completed in the first electronic device. Alternatively, some steps are completed in the UWB tag, and other steps are completed in the second electronic device. The principle is the same as or similar to that described in the foregoing embodiments. It should be noted that the execution body of the UWB base station anomaly detection method is not limited in this application.

In addition, a person of ordinary skill in the art may learn that the technical solutions provided in embodiments of this application are also applicable to similar technical problems as the UWB positioning system evolves and new service scenarios emerge.

Figure 17:
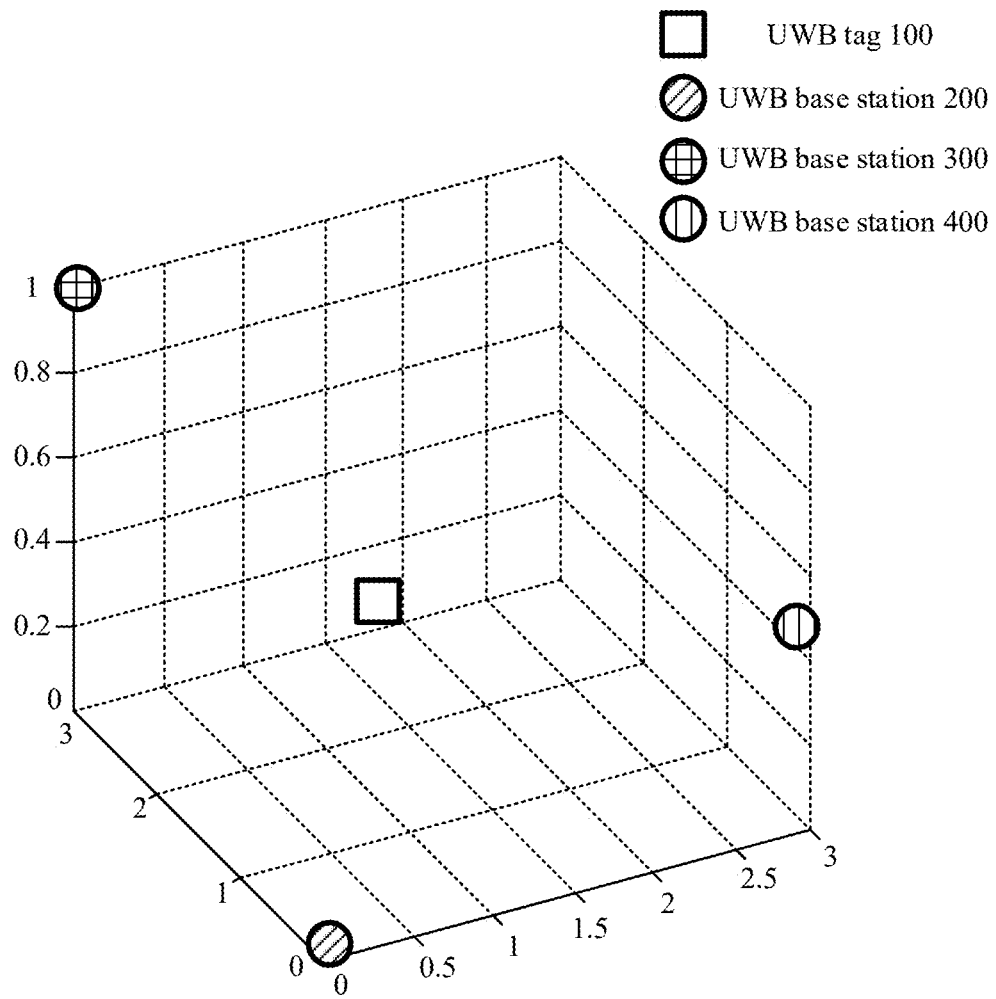
FIG. 17 is a schematic simulation diagram of the UWB positioning system in FIG. 1 according to an embodiment of this application.

Optionally, to verify feasibility of the UWB base station anomaly detection method provided in this embodiment of this application, a positioning system of three UWB base stations and one UWB tag may be simulated in a simulated spatial scenario for verification. For example, the UWB positioning system shown in FIG. 1 may be simulated in the simulated spatial scenario. FIG. 17 is a schematic simulation diagram of the UWB positioning system in FIG. 1 according to an embodiment of this application. As shown in FIG. 17, the UWB base station 200, the UWB base station 300, the UWB base station 400, and the UWB tag 100 may be simulated in the simulated spatial scenario. Then, the UWB base station anomaly detection method provided in this embodiment of this application may be applied to perform simulation verification in the UWB positioning system shown in FIG. 17. In the simulation, a positioning error may be set to 0.05 m, and an abnormal movement distance of one UWB base station (which may be any one of the UWB base station 200, the UWB base station 300, and the UWB base station 400) may be set to 0.1 to 1.0 m in sequence. A quantity of simulation times under each simulation condition may be a quantity of times (for example, moo times) greater than a specific threshold.

According to the UWB base station anomaly detection method provided in this embodiment of this application, in a process of performing simulation verification in the UWB positioning system shown in FIG. 17, statistics such as an anomaly detection success rate and a false alarm rate may be collected in the simulation process. The anomaly detection success rate indicates a probability that an abnormal UWB base station can be successfully detected by using the UWB base station anomaly detection method provided in this embodiment of this application when the UWB base station is abnormal (that is, the UWB base station is moved in the simulation). The false alarm rate indicates a probability that the UWB base station is incorrectly determined as an abnormal UWB base station by using the UWB base station anomaly detection method provided in this embodiment of this application when the UWB positioning system works normally.

Figure 18:
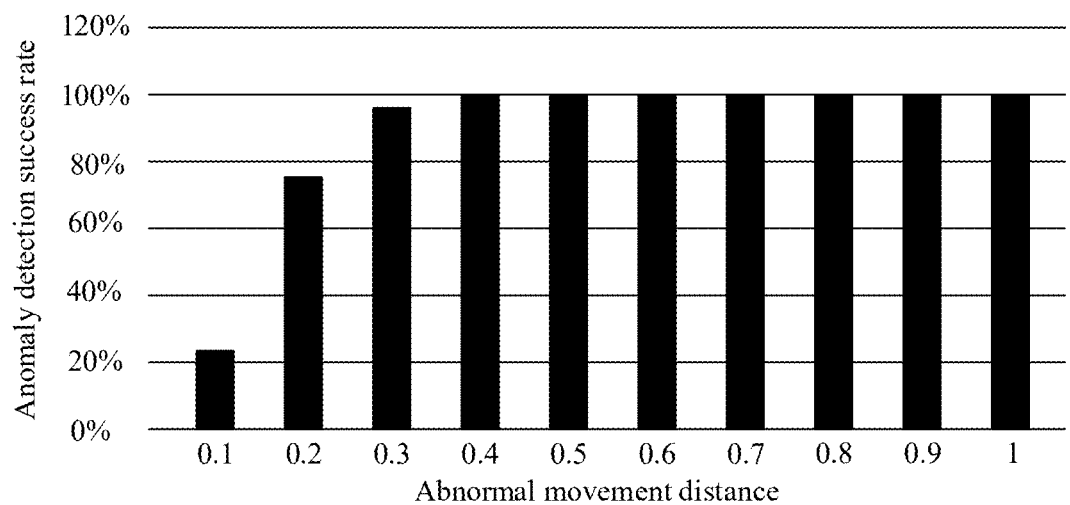
FIG. 18 is a schematic statistical diagram of anomaly detection success rates at different abnormal movement distances according to an embodiment of this application.
Figure 19:
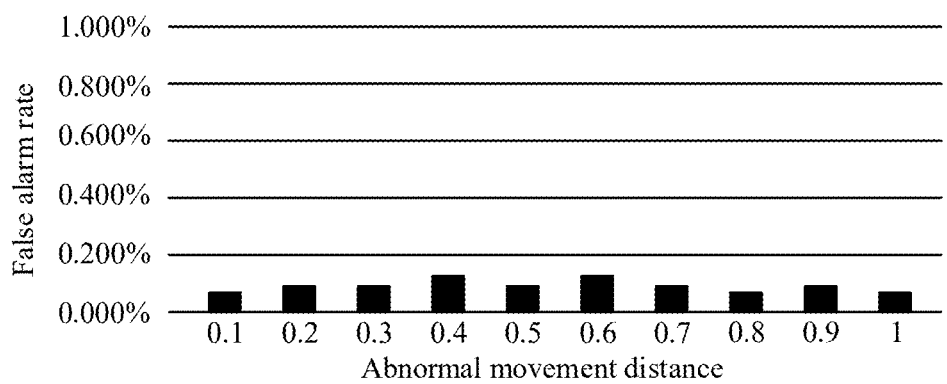
FIG. 19 is a schematic statistical diagram of false alarm rates at different abnormal movement distances according to an embodiment of this application.

FIG. 18 is a schematic statistical diagram of anomaly detection success rates at different abnormal movement distances according to an embodiment of this application. FIG. 19 is a schematic statistical diagram of false alarm rates at different abnormal movement distances according to an embodiment of this application. The different abnormal movement distances mean 0.1 to 1.0 m mentioned above. As shown in FIG. 18 and FIG. 19, in the foregoing simulation process, when an abnormal movement distance of a UWB base station reaches 0.3 m or more, by using the UWB base station anomaly detection method provided in this embodiment of this application, the abnormal UWB base station can be identified at a probability of nearly 100%, and the false alarm rate always remains within a small range (lower than 0.200%). That the anomaly detection success rate decreases when the abnormal movement distance of the UWB base station is small is mainly caused by disturbance of the positioning error. When ranging precision is improved, a small abnormal movement distance can also be detected at a high probability.

Figure 20:
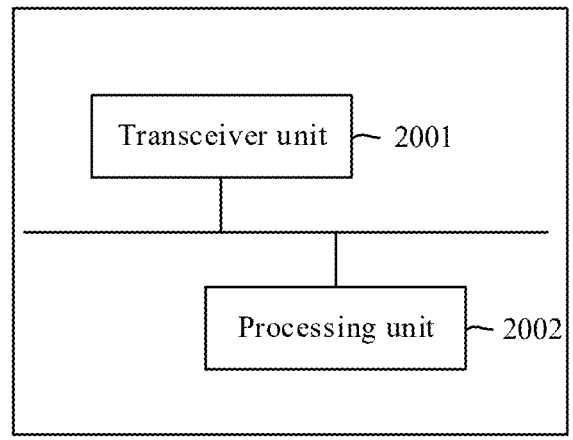
FIG. 20 is a schematic diagram of a structure of an electronic device according to an embodiment of this application.

Corresponding to the UWB base station anomaly detection method in the foregoing embodiment, an embodiment of this application further provides an electronic device, configured to implement the foregoing UWB base station anomaly detection method. The electronic device may be the UWB tag, the UWB base station, the foregoing first electronic device, or the foregoing second electronic device. A function of the electronic device may be implemented by hardware, or may be implemented by hardware executing corresponding software. The hardware or the software includes one or more modules or units corresponding to the foregoing functions. For example, FIG. 20 is a schematic diagram of a structure of an electronic device according to an embodiment of this application. As shown in FIG. 20, the electronic device may include a transceiver unit 2001 and a processing unit 2002.

The transceiver unit 2001 may be configured to send and receive information or data, or configured to communicate with another device. The processing unit 2002 may be configured to process data. The transceiver unit 2001 and the processing unit 2002 may cooperate to implement the UWB base station anomaly detection method in embodiments of this application.

For example, when the electronic device is the UWB tag, the transceiver unit 2001 may be configured to perform S701 (or S1301) in the foregoing embodiment, and the processing unit 2002 may be configured to perform S702 to S711 (or S1302 to S1313) in the foregoing embodiment.

For another example, when the electronic device is the second electronic device, the transceiver unit 2001 may be configured to perform S1601 in the foregoing embodiment, and the processing unit 2002 may be configured to perform S1602 to S1613 in the foregoing embodiment.

It should be understood that division of the foregoing apparatus (namely, the electronic device shown in FIG. 20) into the units or modules (units for short below) is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware.

For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in the processor element, or may be implemented in a form of software invoked by the processing element.

In an example, the unit in the foregoing apparatus may be one or more integrated circuits configured to implement the foregoing method, for example, one or more application-specific integrated circuits (application specific integrated circuits, ASICs), one or more digital signal processors (digital signal processors, DSPs), one or more field programmable gate arrays (field programmable gate arrays, FPGAs), or a combination of at least two of the integrated circuits.

For another example, when the unit in the apparatus may be implemented in a form of a program invoked by a processing element, the processing element may be a general-purpose processor, for example, a CPU or another processor that can invoke the program. For still another example, the units may be integrated and implemented in a form of a system-on-a-chip (system-on-a-chip, SOC).

In an implementation, units in the foregoing apparatus for implementing the steps in the foregoing method may be implemented in a form of scheduling a program by using a processing unit. For example, the apparatus may include a processing element and a storage element. The processing element invokes a program stored in the storage element, to perform the method in the foregoing method embodiments. The storage element may be a storage element located on a same chip as the processing element, namely, an on-chip storage element.

In another implementation, a program used to perform the method may be in a storage element that is on a different chip from the processing unit, namely, an off-chip storage element. In this case, the processing element invokes or loads a program from the off-chip storage element to the on-chip storage element, to invoke and perform the method in the foregoing method embodiments.

For example, an embodiment of this application may further provide an electronic device. The electronic device may include a processor, and a memory configured to store instructions to be executed by the processor. When the processor is configured to execute the foregoing instructions, the electronic device is enabled to implement the UWB base station anomaly detection method in the foregoing embodiment. The electronic device may be the UWB tag, the UWB base station, the first electronic device, or the second electronic device in the foregoing embodiments. The memory may be inside the electronic device, or may be outside the electronic device. In addition, there are one or more processors.

In another implementation, units in the apparatus for implementing the steps in the foregoing method may be configured as one or more processing elements. The processing element herein may be an integrated circuit, for example, one or more ASICs, one or more DSPs, one or more FPGAs, or a combination of the types of integrated circuits. These integrated circuits may be integrated together to form a chip.

For example, an embodiment of this application further provides a chip, and the chip may be applied to the foregoing electronic device. The chip includes one or more interface circuits and one or more processors. The interface circuit and the processor are interconnected through a line. The processor receives and executes computer instructions from the memory of the electronic device through the interface circuit, to implement the UWB base station anomaly detection method in the foregoing method embodiments.

For example, the chip may be a UWB tag.

Based on the descriptions of the foregoing implementations, a person skilled in the art can clearly understand that, for ease and brevity of description, division into the foregoing functional modules is merely used as an example for illustration. In actual application, the foregoing functions can be allocated to different functional modules and implemented as required. In other words, an inner structure of an apparatus is divided into different functional modules to implement all or some of the functions described above.

In several embodiments provided in this application, it should be understood that the disclosed apparatus and method may be implemented in other manners. The described apparatus embodiments are merely examples. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product, for example, a program. The software product is stored in a program product, for example, a computer-readable storage medium, and includes several instructions for instructing a device (which may be a single-chip microcomputer, a chip, or the like) or a processor (processor) to perform all or some of the steps of the method described in embodiments of this application. The foregoing storage medium includes any medium that can store program code, like a USB flash drive, a removable hard disk, a ROM, a RAM, a magnetic disk, or an optical disc.

For example, an embodiment of this application may further provide a computer-readable storage medium, where the computer-readable storage medium stores computer program instructions. When the computer program instructions are executed by an electronic device, the electronic device is enabled to implement the UWB base station anomaly detection method in the foregoing method embodiments.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to an ultra-wideband (UWB) tag or a UWB base station, and comprising:
    obtaining a first set of distances that is between each of N UWB base stations and the UWB tag and that is obtained through measurement, wherein:
        the UWB tag and the UWB base station of the N UWB base stations are located in a UWB positioning system,
        the UWB positioning system comprises the UWB tag and the N UWB base stations,
        N is a positive integer greater than or equal to 3, and
        a first coordinate system is established based on the UWB positioning system;
    obtaining an estimated value of spatial coordinates of the UWB tag in the first coordinate system based on the first set of distances and spatial coordinates of each UWB base station in the first coordinate system;
    obtaining a second set of distances between each of the N UWB base stations and the UWB tag based on the estimated value of the spatial coordinates of the UWB tag in the first coordinate system and the spatial coordinates of each UWB base station in the first coordinate system; and
    determining, based on the first set of distances and the second set of distances that correspond to each of the N UWB base stations, whether a UWB base station in the N UWB base stations is abnormal.

2. The method according to claim 1, wherein determining, based on the first set of distances and the second set of distances that correspond to each of the N UWB base stations, whether the UWB base station in the N UWB base stations is abnormal comprises:
    obtaining, based on the first set of distances and the second set of distances that correspond to each of the N UWB base stations, an absolute value of a difference between the first set of distances and the second set of distances that correspond to each of the N UWB base stations, and summing absolute values of differences corresponding to all of the N UWB base stations, to obtain a first value;
    updating an anomaly detection times variable based on the first value and a product value of a preset threshold coefficient and a sliding threshold; and
    when the updated anomaly detection times variable is greater than a preset anomaly detection times threshold, determining that the UWB base station in the UWB positioning system is abnormal, wherein
    the sliding threshold and the anomaly detection times variable each are preset with an initial value during initialization.

3. The method according to claim 2, wherein updating the anomaly detection times variable based on the first value and the product value of the preset threshold coefficient and the sliding threshold comprises:
    when the first value is greater than the product value of the preset threshold coefficient and the sliding threshold, increasing the anomaly detection times variable by a first amplitude of a first preset interval; or
    when the first value is less than the product value of the preset threshold coefficient and the sliding threshold, reducing the anomaly detection times variable by a second amplitude of a second preset interval.

4. The method according to claim 3, wherein after reducing the anomaly detection times variable by the second amplitude of the second preset interval, the method further comprises:
updating the sliding threshold based on the first value.

5. The method according to claim 4, wherein updating the sliding threshold based on the first value comprises:
updating the sliding threshold according to the following formula:

$$T_w = a \cdot T_{w-1} + (1-a) \cdot S,$$

wherein:
$T_{w-1}$ represents the sliding threshold,
$T_w$ represents an updated sliding threshold,
S represents the first value, and
a represents a filtering coefficient.

6. The method according to claim 5, wherein:
after increasing the anomaly detection times variable by the first amplitude of the first preset interval, or after updating the sliding threshold, the method further comprises:
when the updated anomaly detection times variable is less than 0, setting the anomaly detection times variable to 0.

7. The method according to claim 1, wherein, after determining that the UWB base station in the N UWB base stations is abnormal, the method further comprises:
determining a first target UWB base station, wherein the first target UWB base station is any one of the N UWB base stations;
obtaining a third set of distances that are between the first target UWB base station and other N−1 UWB base stations and that are obtained by the first target UWB base station through a plurality of times of measurement;
obtaining distance errors between the first target UWB base station and the other N−1 UWB base stations in each measurement based on the third set of distances and spatial coordinates of the first target UWB base station and the other N−1 UWB base stations in the first coordinate system; and
when a quantity of times that a distance error between at least one of the other N−1 UWB base stations and the first target UWB base station exceeds a preset error threshold in the plurality of times of measurement is greater than a preset quantity of times, determining that the UWB base station is abnormal.

8. The method according to claim 7, further comprising:
when a second quantity of times that a second distance error between each of the other N−1 UWB base stations and the first target UWB base station exceeds the preset error threshold in the plurality of times of measurement is greater than the preset quantity of times, obtaining a fourth distance that is between any two of the other N−1 UWB base stations and that is obtained by performing a second plurality of times of measurement;
obtaining the second distance error between two base stations in each measurement based on the fourth distance and spatial coordinates of the two base stations in the first coordinate system; and
when the second quantity of times that the second distance error between two UWB base stations exceeds the preset error threshold in the plurality of times of measurement is greater than the preset quantity of times, determining that the other N−1 UWB base stations are all abnormal; or
when the second quantity of times that the second distance error between two UWB base stations exceeds the preset error threshold in the plurality of times of measurement is less than the preset quantity of times, determining that the first target UWB base station is abnormal.

9. The method according to claim 1, wherein obtaining the estimated value of the spatial coordinates of the UWB tag in the first coordinate system based on the first set of distances between each UWB base station and the UWB tag and the spatial coordinates of each UWB base station in the first coordinate system comprises:
obtaining a first equation set comprising N equations based on the first set of distances between each UWB base station and the UWB tag and the spatial coordinates of each UWB base station in the first coordinate system; and
solving the first equation set in a first calculation manner, to obtain the estimated value of the spatial coordinates of the UWB tag in the first coordinate system.

10. The method according to claim 9, wherein solving the first equation set in the first calculation manner, to obtain the estimated value of the spatial coordinates of the UWB tag in the first coordinate system comprises:
calculating the first equation set in a Newton's method;
when each Newton iteration is performed, solving a linear matrix equation in a Newton iteration cycle in a least square method; and
when the Newton iteration converges, outputting a calculation result of the first equation set, wherein the calculation result is the estimated value of the spatial coordinates of the UWB tag in the first coordinate system.

11. An ultra-wideband (UWB) base station, comprising:
a processor,
a memory coupled to the processor; and
a computer program stored on the memory, wherein:
the UWB base station is located in a UWB positioning system,
the UWB positioning system comprises a UWB tag and N UWB base stations,
N is a positive integer greater than or equal to 3,
a first coordinate system is established based on the UWB positioning system, and
when the computer program is executed by the processor, the UWB base station is enabled to:
obtain a first set of distances that is between each of the N UWB base stations and the UWB tag and that is obtained through measurement;
obtain an estimated value of spatial coordinates of the UWB tag in the first coordinate system based on the first set of distances and spatial coordinates of each of the N UWB base stations in the first coordinate system;
obtain a second set of distances between each UWB base station and the UWB tag based on the estimated value of the spatial coordinates of the UWB tag in the first coordinate system and the spatial coordinates of each of the N UWB base stations in the first coordinate system; and
determine, based on the first set of distances and the second set of distances that correspond to each of the UWB base stations, whether a UWB base station in the N UWB base stations is abnormal.

12. The UWB base station according to claim 11, wherein to determine, based on the first set of distances and the second set of distances that correspond to each of the N UWB base stations, whether the UWB base station in the N UWB base stations is abnormal, the computer program further enables the UWB base station to:
- obtain, based on the first set of distances and the second set of distances, an absolute value of a difference between the first set of distances and the second set of distances, and summing absolute values of differences corresponding to all UWB base stations, to obtain a first value;
- update an anomaly detection times variable based on the first value and a product value of a preset threshold coefficient and a sliding threshold; and
- when the updated anomaly detection times variable is greater than a preset anomaly detection times threshold, determining that the UWB base station in the UWB positioning system is abnormal, wherein
- the sliding threshold and the anomaly detection times variable each are preset with an initial value during initialization.

13. The UWB base station according to claim 12, wherein updating the anomaly detection times variable based on the first value and the product value of the preset threshold coefficient and the sliding threshold comprises:
- when the first value is greater than the product value of the preset threshold coefficient and the sliding threshold, increasing the anomaly detection times variable by a first amplitude of a first preset interval; or
- when the first value is less than the product value of the preset threshold coefficient and the sliding threshold, reducing the anomaly detection times variable by a second amplitude of a second preset interval.

14. The UWB base station according to claim 13, wherein after reducing the anomaly detection times variable by the second amplitude of the second preset interval, the computer program further enables the UWB base station to:
- update the sliding threshold based on the first value.

15. The UWB base station according to claim 14, wherein updating the sliding threshold based on the first value comprises: updating the sliding threshold according to the following formula:

$$T_w = a \cdot T_{w-1} + (1-a) \cdot S,$$

wherein:
- $T_{w-1}$ represents the sliding threshold,
- $T_w$ represents an updated sliding threshold,
- S represents the first value, and
- a represents a filtering coefficient.

16. The UWB base station according to claim 15, wherein:
- after increasing the anomaly detection times variable by the first amplitude of the first preset interval, or after the updating the sliding threshold,
  - the computer program further enables the UWB base station to: when the updated anomaly detection times variable is less than 0, set the anomaly detection times variable to 0.

17. The UWB base station according to claim 11, wherein after determining that the UWB base station in the N UWB base stations is abnormal, the computer program further enables the UWB base station to:
- determine a first target UWB base station, wherein the first target UWB base station is any one of the N UWB base stations;
- obtain a third set of distances that are between the first target UWB base station and other N−1 UWB base stations and that are obtained by the first target UWB base station through a plurality of times of measurement;
- obtaining distance errors between the first target UWB base station and the other N−1 UWB base stations in each measurement based on the third set of distances and spatial coordinates of the first target UWB base station and the other N−1 UWB base stations in the first coordinate system; and
- when a quantity of times that a distance error between at least one of the other N−1 UWB base stations and the first target UWB base station exceeds a preset error threshold in the plurality of times of measurement is greater than a preset quantity of times, determine that the UWB base station is abnormal.

18. The UWB base station according to claim 17, wherein the computer program further enables the UWB base station to:
- when a second quantity of times that a second distance error between each of the other N−1 UWB base stations and the first target UWB base station exceeds the preset error threshold in the plurality of times of measurement is greater than the preset quantity of times, obtain a fourth distance that is between any two of the other N−1 UWB base stations and that is obtained by performing a second plurality of times of measurement;
- obtain the second distance error between the two base stations in each measurement based on the fourth distance and spatial coordinates of the two base stations in the first coordinate system; and
- when the second quantity of times that a distance error between two UWB base stations exceeds the preset error threshold in the plurality of times of measurement is greater than the preset quantity of times, determining that the other N−1 UWB base stations are all abnormal; or
- when the second quantity of times that the second distance error between two UWB base station exceeds the preset error threshold in the plurality of times of measurement is less than the preset quantity of times, determining that the first target UWB base station is abnormal.

19. The UWB base station according to claim 11, wherein, to obtain the estimated value of spatial coordinates of the UWB tag in the first coordinate system based on the first set of distances between each UWB base station and the UWB tag and the spatial coordinates of each UWB base station in the first coordinate system, the computer program further enables the UWB base station to:
- obtain a first equation set comprising N equations based on the first set of distances between each UWB base station and the UWB tag and the spatial coordinates of each UWB base station in the first coordinate system; and
- solve the first equation set in a first calculation manner to obtain the estimated value of the spatial coordinates of the UWB tag in the first coordinate system.

20. The UWB base station according to claim 19, wherein to solve the first equation set in the first calculation manner to obtain the estimated value of the spatial coordinates of the UWB tag in the first coordinate system, the computer program further enables the UWB base station to:
- calculate the first equation set in a Newton's method;
- when each Newton iteration is performed, solve a linear matrix equation in a Newton iteration cycle in a least square method; and when the Newton iteration converges, output a calculation result of the first equation set, wherein the calculation result is the estimated value of the spatial coordinates of the UWB tag in the first coordinate system.

* * * * *